(12) United States Patent
Hattori et al.

(10) Patent No.: US 12,081,347 B2
(45) Date of Patent: Sep. 3, 2024

(54) RECEPTION TERMINAL AND METHOD

(71) Applicant: Sony Group Corporation, Tokyo (JP)

(72) Inventors: Takafumi Hattori, Kanagawa (JP); Chisato Kemmochi, Kanagawa (JP); Shiro Suzuki, Kanagawa (JP); Ryuji Tokunaga, Tokyo (JP); Yuuki Matsumura, Saitama (JP); Jun Matsumoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 27 days.

(21) Appl. No.: 17/780,934

(22) PCT Filed: Nov. 20, 2020

(86) PCT No.: PCT/JP2020/043421
§ 371 (c)(1),
(2) Date: May 27, 2022

(87) PCT Pub. No.: WO2021/111903
PCT Pub. Date: Jun. 10, 2021

(65) Prior Publication Data
US 2022/0416949 A1 Dec. 29, 2022

(30) Foreign Application Priority Data
Dec. 5, 2019 (JP) .................................. 2019-220262

(51) Int. Cl.
*H04L 1/1867* (2023.01)
(52) U.S. Cl.
CPC .................................. *H04L 1/189* (2013.01)
(58) Field of Classification Search
CPC ...................................................... H04L 1/189
(Continued)

(56) References Cited

U.S. PATENT DOCUMENTS

2005/0154965 A1 7/2005 Ichiki
2008/0134005 A1* 6/2008 Izzat .................... H04L 1/0009
714/776
(Continued)

FOREIGN PATENT DOCUMENTS

CN 101026553 A 8/2007
JP 2016-208215 A 12/2016
(Continued)

OTHER PUBLICATIONS

PCT/JP2020/043421, Feb. 22, 2021, International Search Report.
(Continued)

*Primary Examiner* — Lihong Yu
(74) *Attorney, Agent, or Firm* — Wolf, Greenfield & Sacks, P.C.

(57) ABSTRACT

The present technology relates to a reception terminal and a method capable of achieving stable voice transmission regardless of the device.
A reception terminal receives a packet transmitted from a transmission terminal, the packet including main data and redundant data generated on the basis of a redundancy degree determined on the basis of a retransmission timeout period that is a time determined by a combination of the transmission and reception terminals and in which retransmission processing of the main data can be repeatedly executed and used for restoration or interpolation of the main data, and decodes reproduction data by decoding the main data or the redundant data. The present technology can be applied to a communication system that performs voice transmission using BLE.

16 Claims, 32 Drawing Sheets

(58) Field of Classification Search
USPC .......................................................... 375/316
See application file for complete search history.

(56) References Cited

U.S. PATENT DOCUMENTS

| | | |
|---|---|---|
| 2009/0103517 A1 | 4/2009 | Ohmuro et al. |
| 2018/0091998 A1 | 3/2018 | Kemmochi |
| 2018/0183617 A1 | 6/2018 | Fukada et al. |
| 2018/0332602 A1* | 11/2018 | Lee .................... H04W 72/569 |
| 2019/0103881 A1* | 4/2019 | Connor ............... H03M 13/093 |

FOREIGN PATENT DOCUMENTS

| | | |
|---|---|---|
| JP | 2017-092692 A | 5/2017 |
| WO | WO 2005/109401 A1 | 11/2005 |
| WO | WO-2014083739 A1 | 6/2014 |
| WO | WO 2015/072005 A1 | 5/2015 |
| WO | WO 2017/002291 A1 | 1/2017 |

OTHER PUBLICATIONS

International Search Report and English translation thereof mailed Feb. 22, 2021 in connection with International Application No. PCT/JP2020/043421.

* cited by examiner

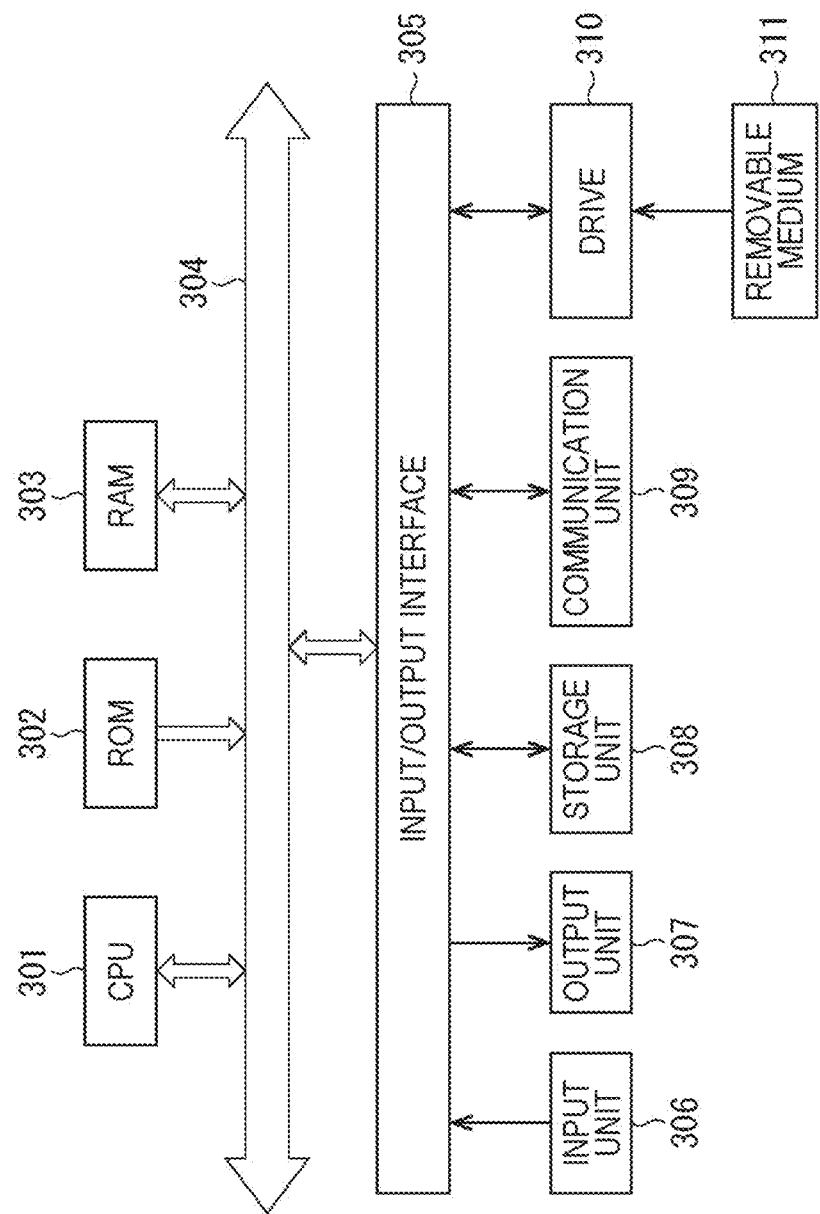

RECEPTION TERMINAL AND METHOD

CROSS-REFERENCE TO RELATED APPLICATIONS

This application claims the benefit under 35 U.S.C. § 371 as a U.S. National Stage Entry of International Application No. PCT/JP2020/043421, filed in the Japanese Patent Office as a Receiving Office on Nov. 20, 2020, which claims priority to Japanese Patent Application Number JP2019-220262, filed in the Japanese Patent Office on Dec. 5, 2019, each of which is hereby incorporated by reference in its entirety.

TECHNICAL FIELD

The present technology relates to a reception terminal and a method, and more particularly, to a reception terminal and a method capable of achieving stable voice transmission regardless of the device.

BACKGROUND ART

In voice transmission by Bluetooth low energy (Hereinafter, BLE) under formulation of a standard, a packet is transmitted at regular intervals called ISO Interval. A packet that has not been successfully transmitted during this period is retransmitted at the next ISO Interval in response to a request from a reception terminal. A time during which the retransmission processing can be repeated is referred to as a retransmission timeout period.

Since the packet whose transmission has not succeeded within the retransmission timeout period is discarded, it is necessary to perform packet loss concealment for restoring or interpolating data in the discarded packet (lost packet). However, since the retransmission timeout period is determined for each combination of transmission and reception terminals, the necessary quality of packet loss concealment (concealment quality) varies depending on the combination of devices even under the same radio wave environment.

In view of the foregoing, Patent Document 1 proposes a method of measuring line quality information in a reception terminal, transmitting the data to a transmission terminal, and then changing the calculation method of a forward error correction (FEC) code on the transmission side.

Additionally, Patent Document 2 proposes a method of controlling the number of frames of coded data to be transmitted without measuring line quality information by observing the amount of buffer waiting for transmission.

CITATION LIST

Patent Document

Patent Document 1: International Patent Application Publication No. 2015/072005
Patent Document 2: Japanese Patent Application Laid-Open No. 2016-208215

SUMMARY OF THE INVENTION

Problem to be Solved by the Invention

However, in a case where the method described in Patent Document 1 is used in communication using BLE, it is necessary to separately provide a packet loss rate transmission function on the reception side, and it is difficult and unrealistic to cause an indefinite number of vendors to implement such a function in actual operation.

In the method described in Patent Document 2, since control is performed on the basis of the amount of buffer waiting for transmission, it is difficult to appropriately control the number of frames of coded data to be transmitted immediately after the start of transmission, for example.

For this reason, it takes a certain period of time until appropriate control is performed, and depending on the setting of the initial value, the concealment quality may become insufficient and auditory noise or discomfort may be perceived.

The present technology has been made in view of such a situation, and an object thereof is to achieve stable voice transmission regardless of the device.

Solutions to Problem

A reception terminal according to one aspect of the present technology includes: a reception unit that receives a packet transmitted from a transmission terminal, the packet including main data and redundant data generated on the basis of a redundancy degree determined on the basis of a retransmission timeout period that is a time determined by a combination of the transmission terminal and the reception terminal and in which retransmission processing of the main data can be repeatedly executed and used for restoration or interpolation of the main data, and a decoding unit that decodes reproduction data by decoding the main data or the redundant data.

In one aspect of the present technology, a packet transmitted from a transmission terminal is received, the packet including main data and redundant data generated on the basis of a redundancy degree determined on the basis of a retransmission timeout period that is a time determined by a combination of the transmission and reception terminals and in which retransmission processing of the main data can be repeatedly executed and used for restoration or interpolation of the main data. Then, the reproduction data is decoded by decoding the main data or the redundant data.

BRIEF DESCRIPTION OF DRAWINGS

FIG. 32 is a block diagram illustrating a configuration example of a computer.

MODES FOR CARRYING OUT THE INVENTION

Hereinafter, modes for carrying out the present technology will be described. The description will be given in the following order.

0. Outline of present technology

1. First embodiment (system including packet loss concealment)

2. Second embodiment (combination with dynamic control of data amount according to communication status)

3. Third embodiment (control in one-to-many communication)

4. Other

0. Outline of Present Technology

Description of Terms

First, terms used in the present specification will be described.

Among forward error correction schemes, "media-specific forward error correction (FEC)" is a scheme for holding a plurality of audio-coded data having different coding formats or settings as error correction data.

"Packet loss concealment" is a method of restoring or interpolating data in a packet that is lost as a result of transmission.

"Frame" is a processing unit standardized in coding schemes.

"Main data" is data (coded data) of one frame normally transmitted in a packet. "Redundant data" is data (coded data) of one frame separately added to main data to be used for packet loss concealment or the like.

"Packet" is a transmission unit standardized in transmission schemes, and represents a chunk of data transmitted in one communication. In particular, in the present technology, a packet includes main data and redundant data.

"Redundancy degree" is a degree of redundancy adjusted by the number and quality of redundant data to be added. In the present specification, "redundancy degree" represents the number of pieces of redundant data added to one packet unless otherwise specified.

In BLE voice transmission, packets are transmitted at regular intervals called ISO Interval. A packet that has not been successfully transmitted during this period is retransmitted at the next ISO Interval in response to a request from a reception terminal. Hereinafter, a time during which the retransmission process can be repeated is referred to as a retransmission timeout period.

Since a packet whose transmission has not succeeded within the retransmission timeout period is discarded, a lost packet is created. Accordingly, when the retransmission timeout period is short, the packet loss frequency, which is the frequency at which a lost packet is created, increases. On the other hand, when the reproduction timeout period is long, the packet loss frequency decreases.

When a lost packet is created, if the reproduction is performed as it is, a discontinuous point is generated in the audio signal, and this discontinuous point is perceived as an auditory discomfort. In order to prevent this, packet loss concealment is performed, for example.

<Outline of Packet Loss Concealment>

Figure 1:
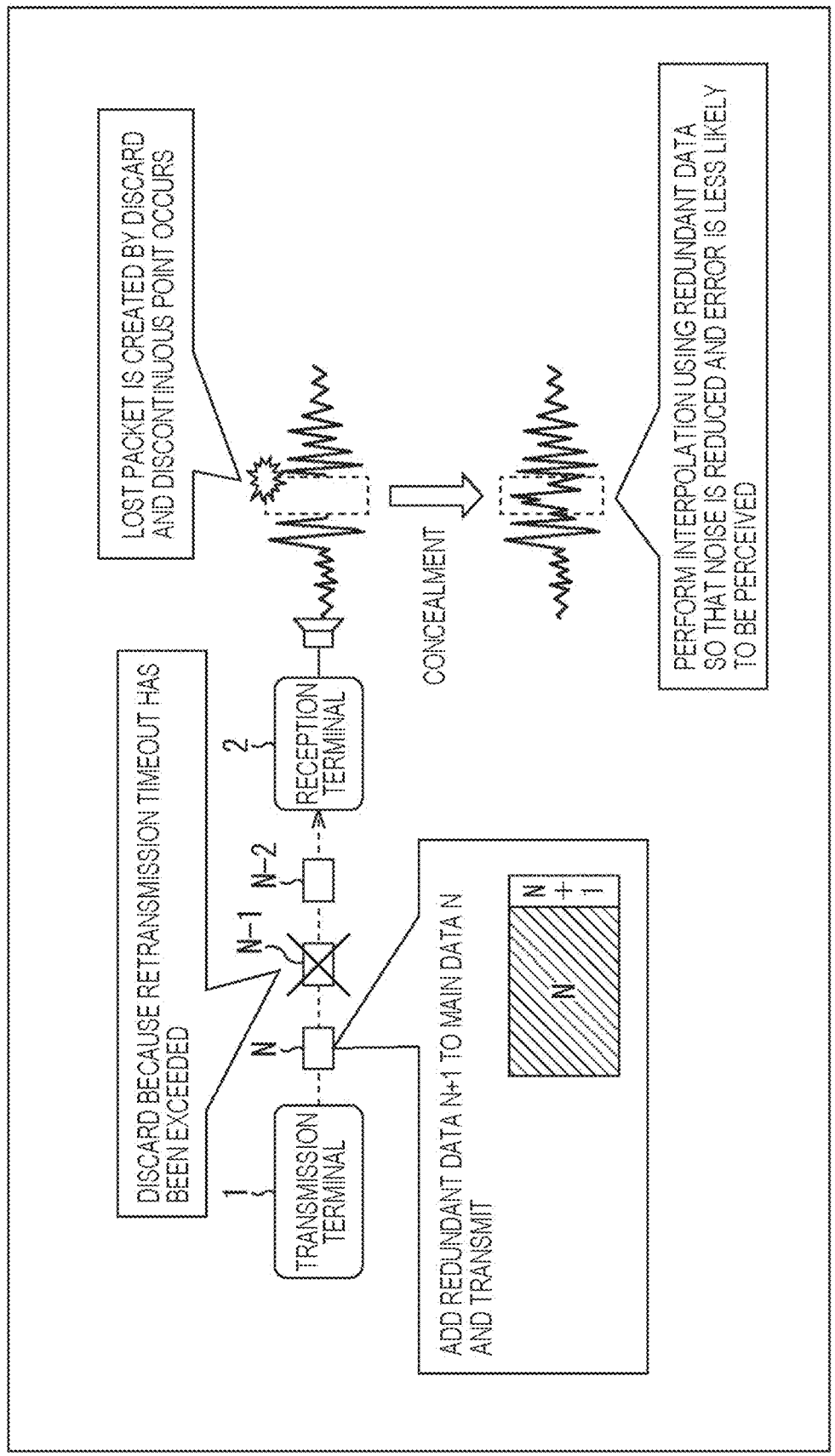
FIG. 1 is a diagram illustrating an outline of packet loss concealment.

FIG. 1 is a diagram illustrating an outline of packet loss concealment using media-specific FEC (hereinafter simply referred to as packet loss concealment).

In FIG. 1, a rectangle illustrated between a transmission terminal 1 and a reception terminal 2 represents a packet being transmitted from the transmission terminal 1 to the reception terminal 2.

First, the transmission terminal 1 adds, as redundant data, audio data of a frame before or after main data to the audio data as the main data, and transmits the audio data. Redundant data is generally different in coding method or setting from main data, and has lower quality than main data. For example, in an Nth packet, redundant data of an N+1th frame is added to main data of an Nth frame. In the packet of the N−1th frame transmitted earlier, redundant data of the Nth frame is added to the main data of the N−1th frame. Similarly, in the N−2th packet, redundant data of the N−1th frame is added to the main data of the N−2th frame.

As indicated by a cross in FIG. 1, when the N−1th packet is discarded because the retransmission timeout period has been exceeded, if the reception terminal 2 reproduces only the main data as it is, a lost packet is created due to the discard of the N−1th packet, and a discontinuous point occurs.

Hence, when the main data of the N−1th frame included in the N−1th packet is lost, the reception terminal 2 performs interpolation by using the redundant data of the N−1th frame included in the N−2th packet as a concealment. As a result, although the main data of the N−1th frame is not completely restored, noise is reduced, and an error (auditory discomfort) is less likely to be perceived.

Note that while FIG. 1 illustrates an example in which audio data of a future frame is added as redundant data, the redundant data to be added may be audio data of a past frame.

<Relationship Between Number of Pieces of Redundant Data and Possible Range of Concealment>

Figure 2:
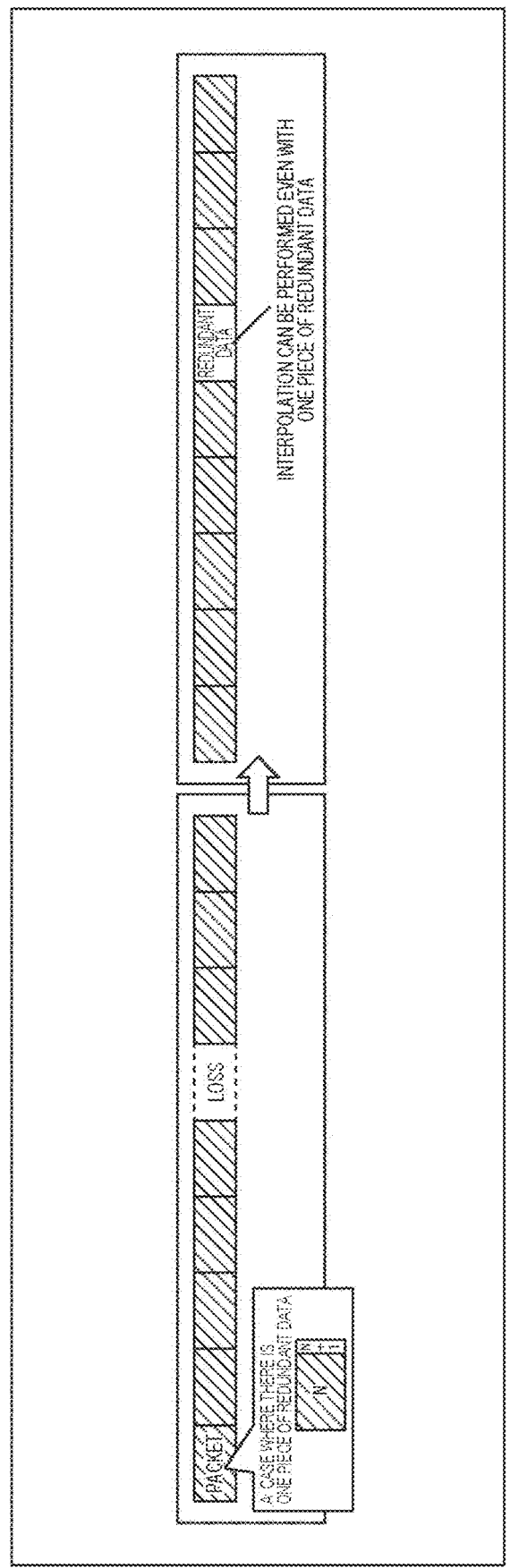
FIG. 2 is a diagram illustrating a relationship between the number of pieces of redundant data and a possible range of concealment.
Figure 3:
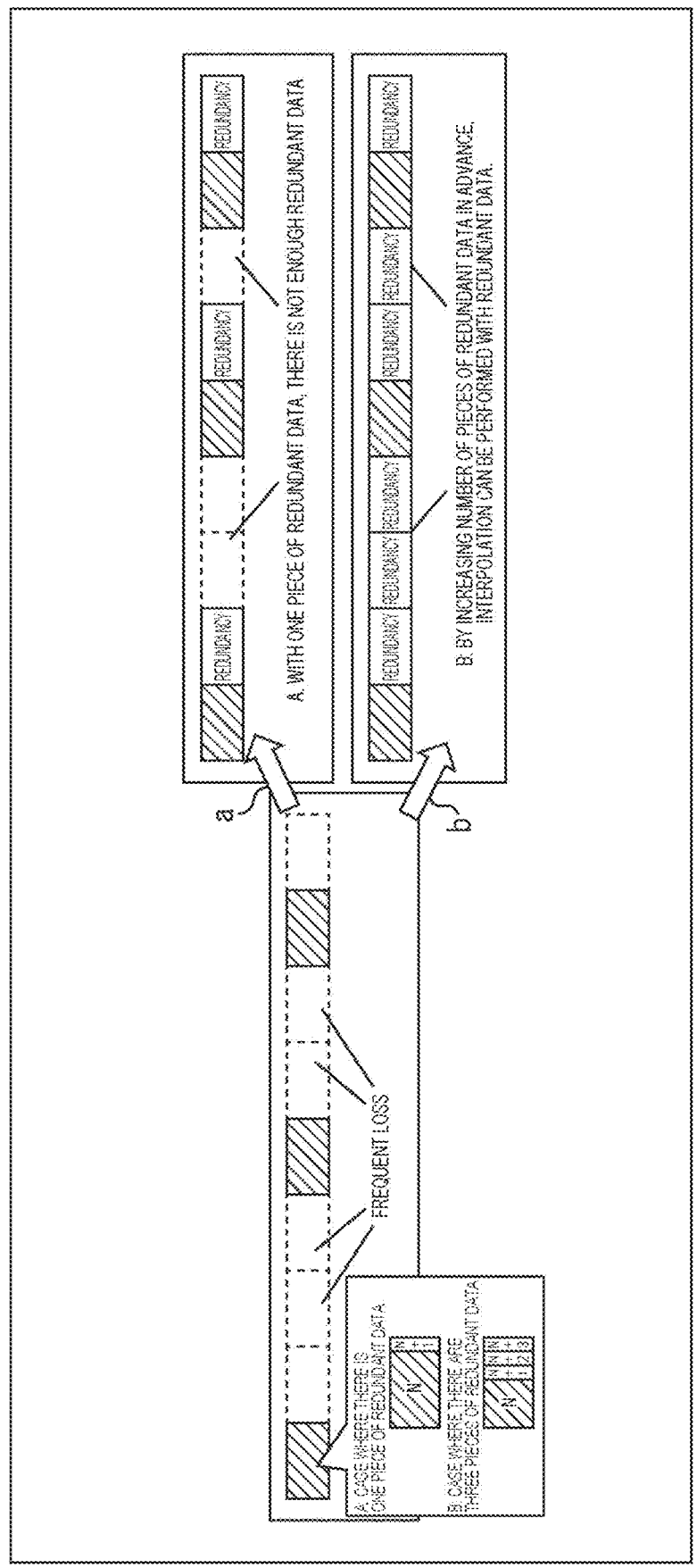
FIG. 3 is a diagram illustrating a relationship between the number of pieces of redundant data and a possible range of concealment.

FIGS. 2 and 3 are diagrams illustrating a relationship between the number of pieces of redundant data and the possible range of concealment. Note that FIGS. 2 and 3 illustrate an example of one frame/one packet.

FIG. 2 illustrates a packet having a packet configuration A, and FIG. 3 illustrates a packet having a packet configuration A and a packet having a packet configuration B. In the packet having the packet configuration A, one piece of redundant data (number of pieces of redundant data: one) is added to one piece of main data. In the packet having the packet configuration B, three pieces of redundant data (number of pieces of redundant data: three) are added to one piece of main data.

Moreover, in FIGS. 2 and 3, the packet before the concealment in the reception terminal 2 is illustrated on the left side, and the packet after the concealment in the reception terminal 2 is illustrated on the right side.

As illustrated in FIG. 2, in a case where the packet loss frequency is low, interpolation of the main data in the lost packet can be performed by using the packet having the packet configuration A.

On the other hand, in a case where the packet loss frequency is high, as indicated by an arrow a in FIG. 3, when the packet having the packet configuration A is used, the number of pieces of redundant data is insufficient with respect to the number of lost packets, and interpolation of the main data in the lost packets becomes insufficient.

Meanwhile, when the packet having the packet configuration B is used, as indicated by an arrow b in FIG. 3, even if the packet loss frequency is high, every piece of main data in the lost packets can be interpolated with the redundant data.

That is, by increasing the redundant data, the possible range of concealment is widened.

However, in particular, in voice transmission using BLE, a data size that can be stored per packet is a fixed length. Accordingly, as can be seen by comparing the packet configuration A and the packet configuration B in FIG. 3, in order to increase the number of pieces of redundant data and widen the possible range of concealment, it is necessary to reduce the data size of the main data and sacrifice the quality.

Additionally, since the retransmission timeout period is determined for each combination of transmission and reception terminals, the necessary quality of concealment varies depending on the combination of devices even under the same radio wave environment.

Hence, as described above, by using the fact that the retransmission timeout period correlates with the packet loss frequency, in the present technology, the retransmission timeout period is acquired at the time of BLE connection (at start of transmission), and the number of pieces of redundant data that is the redundancy degree is set according to the acquired retransmission timeout period. As a result, it is possible to set an appropriate possible range of concealment according to the combination of devices.

<Method of Determining Number of Pieces of Redundant Data in Present Technology>

Figure 4:
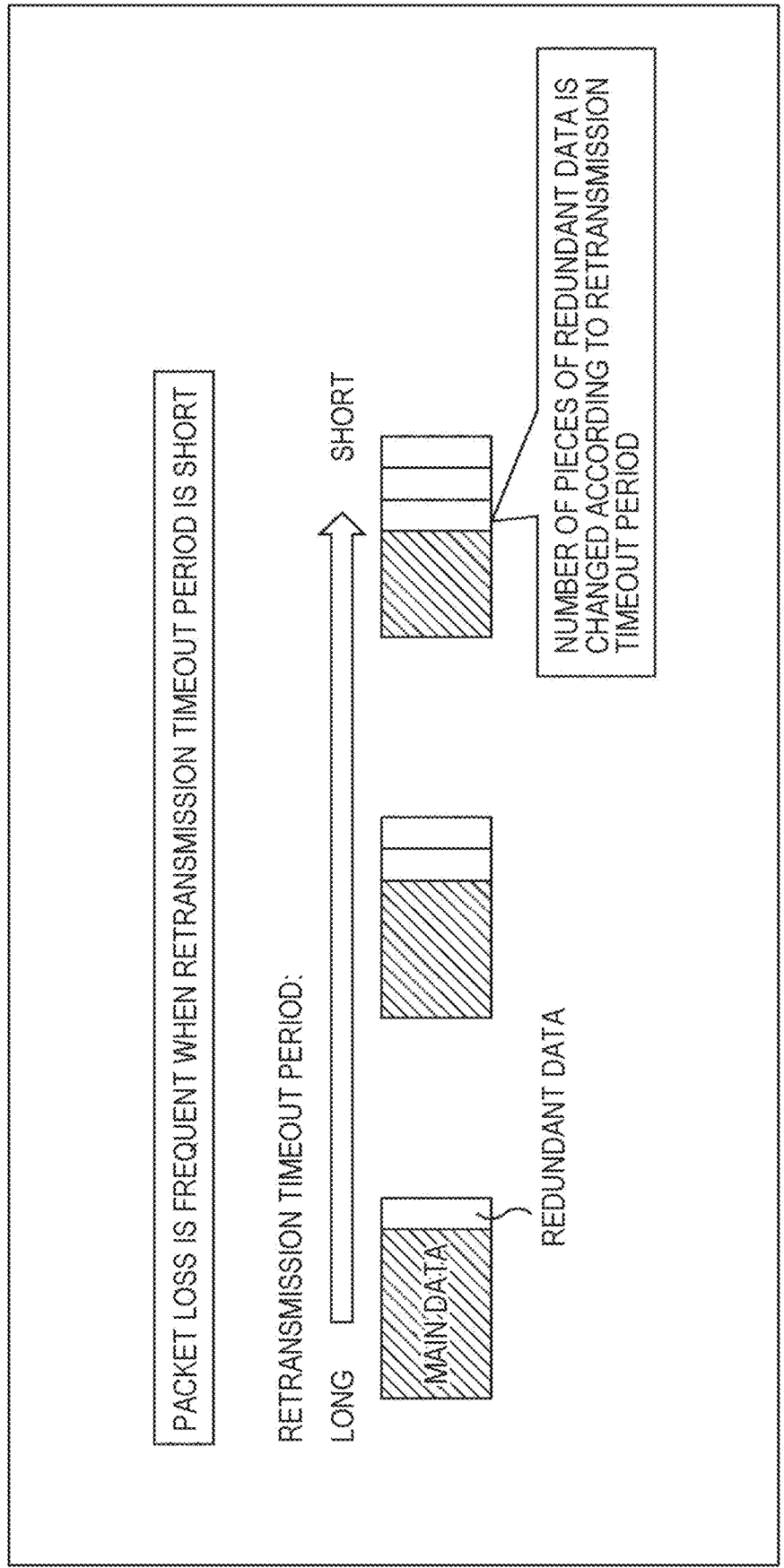
FIG. 4 is a diagram illustrating a method of determining the number of pieces of redundant data according to the present technology.

FIG. 4 is a diagram illustrating a method of determining the number of pieces of redundant data according to the present technology.

In FIG. 4, the retransmission timeout period becomes shorter from the left toward the right. For such a retransmission timeout period, the number of pieces of redundant data is determined to increase from the left toward the right.

That is, in a case where the retransmission timeout period is long, it is expected that the packet loss frequency is low. Hence, in the present technology, it is determined to reduce the number of pieces of redundant data and narrow the possible range of concealment. As a result, less main data to be originally transmitted is sacrificed.

On the other hand, in a case where the retransmission timeout period is short, it is expected that the packet loss frequency is high. Hence, in the present technology, it is determined to increase the number of pieces of redundant data and widen the possible range of concealment. As a result, it is less likely that interpolation of main data in the lost packet becomes insufficient.

The retransmission timeout period can be calculated from a parameter determined at the time of connection by the combination of transmission and reception terminals at the time of connection of BLE communication. The number of pieces of redundant data can be calculated using a calculation formula or a table prepared in advance regarding the relationship between the reproduction timeout period and the appropriate redundancy degree.

Note that an object of the present technology is to ensure high-quality concealment of packet loss occurring at about several percent during communication. Accordingly, a situation in which a burst packet loss occurs, such as a situation in which the communication status is poor and the amount of data necessary for voice transmission cannot be constantly secured, is not subject to the present technology.

1. First Embodiment (System Including Packet Loss Concealment)

<Configuration of Audio Transmission System>

Figure 5:
FIG. 5 is a diagram illustrating a configuration example of an audio transmission system according to an embodiment of the present technology.

FIG. 5 is a diagram illustrating a configuration example of an audio transmission system according to the embodiment of the present technology.

The audio transmission system is configured by connecting a transmission terminal 11 and a reception terminal 12 by BLE communication.

The transmission terminal 11 includes, for example, a multifunctional mobile phone such as a smartphone, a mobile terminal, or the like. At the start of transmission, the transmission terminal 11 calculates the retransmission timeout period and determines the redundancy degree of redundant data. The transmission terminal 11 generates redundant data on the basis of the determined redundancy degree, and codes main data and redundant data including audio data. The transmission terminal 11 transmits a packet including the coded main data and redundant data to the reception terminal 12.

The reception terminal 12 includes, for example, earphones, headphones, or the like. The reception terminal 12 receives packets transmitted from the transmission terminal 11, and temporarily accumulates main data and redundant data separately. In a case where there is main data corresponding to reproduction data to be reproduced, the reception terminal 12 decodes and reproduces the main data. In a case where there is no main data corresponding to reproduction data to be reproduced, the reception terminal 12 decodes and reproduces the redundant data corresponding to the main data.

<Configuration Example of Transmission Terminal>

Figure 6:
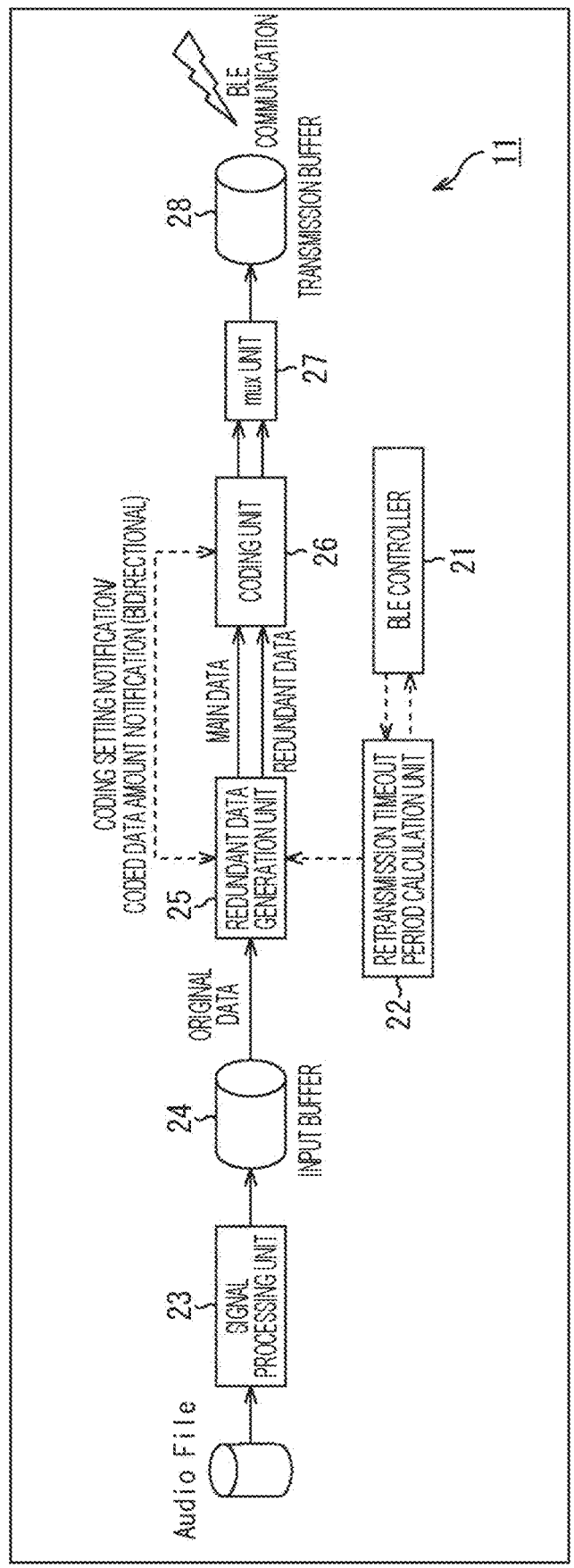
FIG. 6 is a block diagram illustrating a configuration example of a transmission terminal.

FIG. 6 is a block diagram illustrating a configuration example of the transmission terminal 11.

Note that in the configuration example of the transmission terminal 11, details of layers of wireless transmission are omitted. Additionally, in the present specification, it is assumed that main data of one frame and redundant data of one frame or a plurality of frames are stored and transmitted in one packet.

The transmission terminal 11 includes a BLE controller 21, a retransmission timeout period calculation unit 22, a signal processing unit 23, an input buffer 24, a redundant data generation unit 25, a coding unit 26, a multiplexer (mux) unit 27, and a transmission buffer 28.

The BLE controller 21 controls operations related to BLE communication. The BLE controller 21 acquires a parameter determined according to a combination of transmission and reception terminals at the time of connection by BLE communication after the connection by BLE communication is completed, and outputs the parameter to the retransmission timeout period calculation unit 22. Details of the parameters are omitted.

The retransmission timeout period calculation unit 22 calculates a retransmission timeout period on the basis of the parameter supplied from the BLE controller 21. The retransmission timeout period calculation unit 22 outputs the retransmission timeout period to the redundant data generation unit 25.

The signal processing unit 23 acquires audio data necessary for generating one frame from an audio file, performs preprocessing of audio coding, and accumulates data obtained as a result in the input buffer 24. Preprocessing of audio coding is, for example, time-frequency conversion processing.

When the data is accumulated by the signal processing unit 23 and the input buffer 24 is full, the input buffer 24 discards data having the lowest priority (normally, oldest data is discarded).

The redundant data generation unit 25 acquires original data corresponding to the main data and the redundant data from the input buffer 24. Original data corresponding to the main data is audio data for one frame necessary for generating the main data. Original data corresponding to the redundant data is audio data for one or a plurality of frames necessary for generating the redundant data.

Additionally, the coding unit 26 notifies the redundant data generation unit 25 of the coded data amount of the redundant data.

The redundant data generation unit 25 determines the redundancy degree on the basis of the retransmission timeout period supplied from the retransmission timeout period calculation unit 22. The redundant data generation unit 25 generates the main data and the redundant data on the basis of the coded data amount notification of which is provided by the coding unit 26 and the determined redundancy degree.

At this time, which one of the preceding and following packets (N−2th, N−1th, N+1th, or N+2th) is to be restored by the redundant data for the Nth packet can be set by the data accumulated in the input buffer 24. For example, it is possible to accumulate a plurality of pieces of future data in the input buffer 24 and use the accumulated future data for generation of redundant data. Additionally, a plurality of pieces of past data may be accumulated in the input buffer 24, and the accumulated past data may be used for generation of redundant data. For this reason, the redundant data generation method may be set according to an allowable delay amount or other conditions.

The redundant data generation unit 25 outputs the generated main data and redundant data to the coding unit 26. Additionally, the redundant data generation unit 25 determines the coding setting corresponding to the main data and the redundant data output to the coding unit 26, and notifies the coding unit 26 of the determined coding setting. The coding setting is determined by calculating a target data amount.

The coding unit 26 codes the main data and the redundant data on the basis of the acquired coding setting. The coding unit 26 outputs the coded main data and redundant data to the mux unit 27. Additionally, the coding unit 26 outputs the coded data amount of the redundant data to the redundant data generation unit 25.

For example, in a case where three future packets are added to the main data as redundant data, in order to generate the Nth packet, the coding unit 26 acquires main data of the Nth frame, redundant data generated from main data of the N+1th to N+3th frames, and the coding setting of each piece of data from the redundant data generation unit 25.

The mux unit 27 performs mux processing on the coded main data and redundant data supplied from the coding unit 26. That is, the mux unit 27 stores the coded main data and redundant data in a packet suitable for BLE communication. The mux unit 27 accumulates packets in the transmission buffer 28 for BLE communication.

<Operation of Transmission Terminal>

Hereinafter, the basic processing flow of the transmission terminal 11 of the first embodiment will be described separately for system setting processing and transmission packet generation processing. System setting processing is processing performed only once at the time of connection of BLE communication. On the other hand, transmission packet generation processing is processing performed a plurality of times during voice transmission by BLE communication.

<System Setting Processing>

Figure 7:
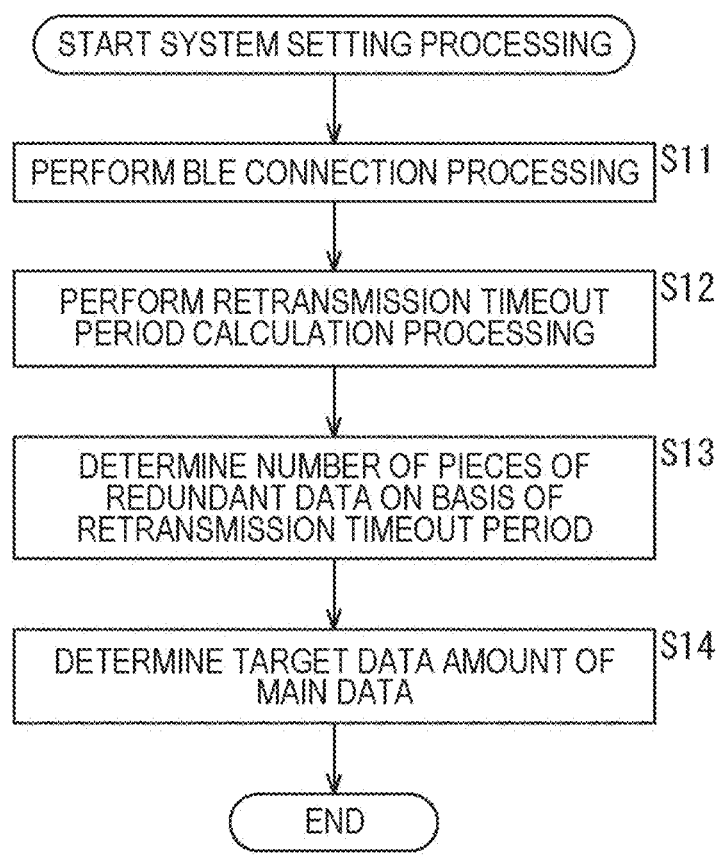
FIG. 7 is a flowchart for describing system setting processing of the transmission terminal.

FIG. 7 is a flowchart for describing system setting processing of the transmission terminal 11.

In step S11, the BLE controller 21 starts BLE communication by performing BLE connection processing. At this time, the BLE controller 21 acquires the parameter related to the retransmission timeout period determined by the combination with the reception terminal 12 from the reception terminal 12, and outputs the parameter to the retransmission timeout period calculation unit 22.

In step S12, the retransmission timeout period calculation unit 22 performs retransmission timeout period calculation processing on the basis of the parameter supplied from the BLE controller 21 and calculates the retransmission timeout period.

In step S13, the redundant data generation unit 25 determines the number of pieces of redundant data (redundancy degree) on the basis of the retransmission timeout period supplied from the retransmission timeout period calculation unit 22. The number of pieces of redundant data is determined by using a relational expression or a table that is prepared in advance and indicates a correspondence between the retransmission timeout period and the number of pieces of redundant data.

In a case where the retransmission timeout period is long, it is expected that the packet loss frequency is low. Hence, in the present technology, the range of the frame corresponding to the redundant data is adjusted and determined, so that the number of pieces of redundant data is reduced and the possible range of concealment is narrowed. At this time, the proportion of redundant data is reduced and the proportion of main data is increased in the packet as compared with a case where the retransmission timeout period is short.

In a case where the retransmission timeout period is short, it is expected that the packet loss frequency is high. Hence, in the present technology, the range of the frame corresponding to the redundant data is adjusted and determined, so that the number of pieces of redundant data is increased and the possible range of concealment is widened. At this time, the proportion of redundant data is increased and the proportion of main data is reduced in the packet as compared with a case where the retransmission timeout period is long.

In step S14, the redundant data generation unit 25 determines the target data amount of the main data on the basis of the determined number of pieces of redundant data and the predetermined target data amount of the redundant data. Additionally, in step S14, when the target data amount of the main data is determined, the coding setting of the main data and the coding setting of the redundant data are determined so as to fall within the target data amount.

Note that a default target data amount per piece of redundant data is determined in advance. Accordingly, the target data amount of the main data is set on the basis of the target data amount of the redundant data, the number of pieces of redundant data, and the data size of the packet.

After step S14, the system setting processing ends.

<Calculation of Target Data Amount>

Figure 8:
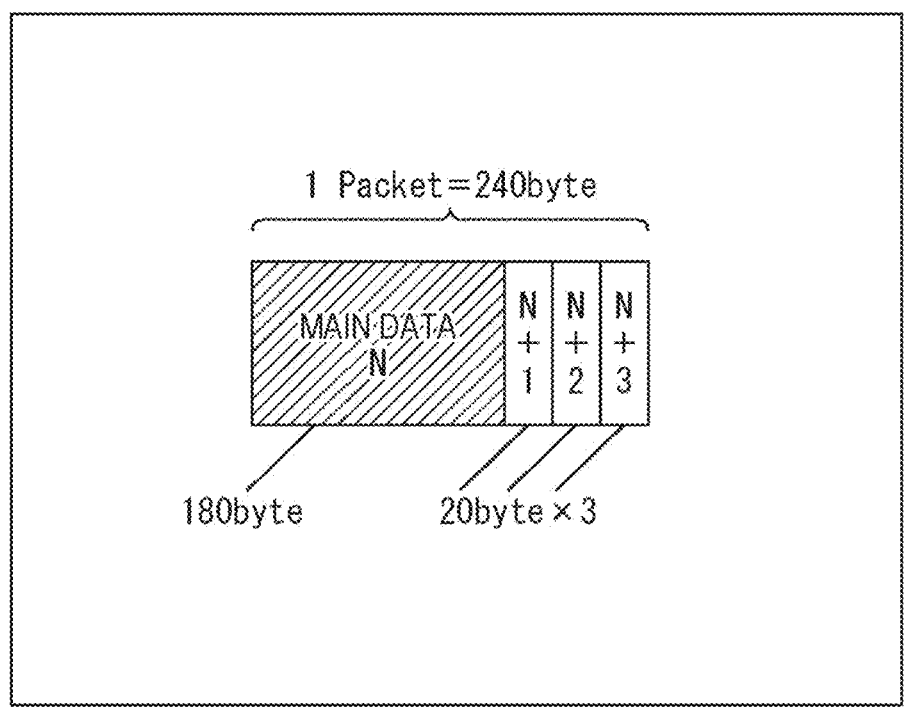
FIG. 8 is a diagram illustrating a specific example of calculation of a target data amount.

FIG. 8 is a diagram illustrating a specific example of calculation of the target data amount.

FIG. 8 illustrates one packet. For example, as illustrated in FIG. 8, in a case where the target data amount of redundant data is 20 [byte], the number of pieces of redundant data is three, and the data size of the packet is 240 [byte], the target data amount of main data is 240−20×3=180 [byte].

<Transmission Packet Generation Processing>

Figure 9:
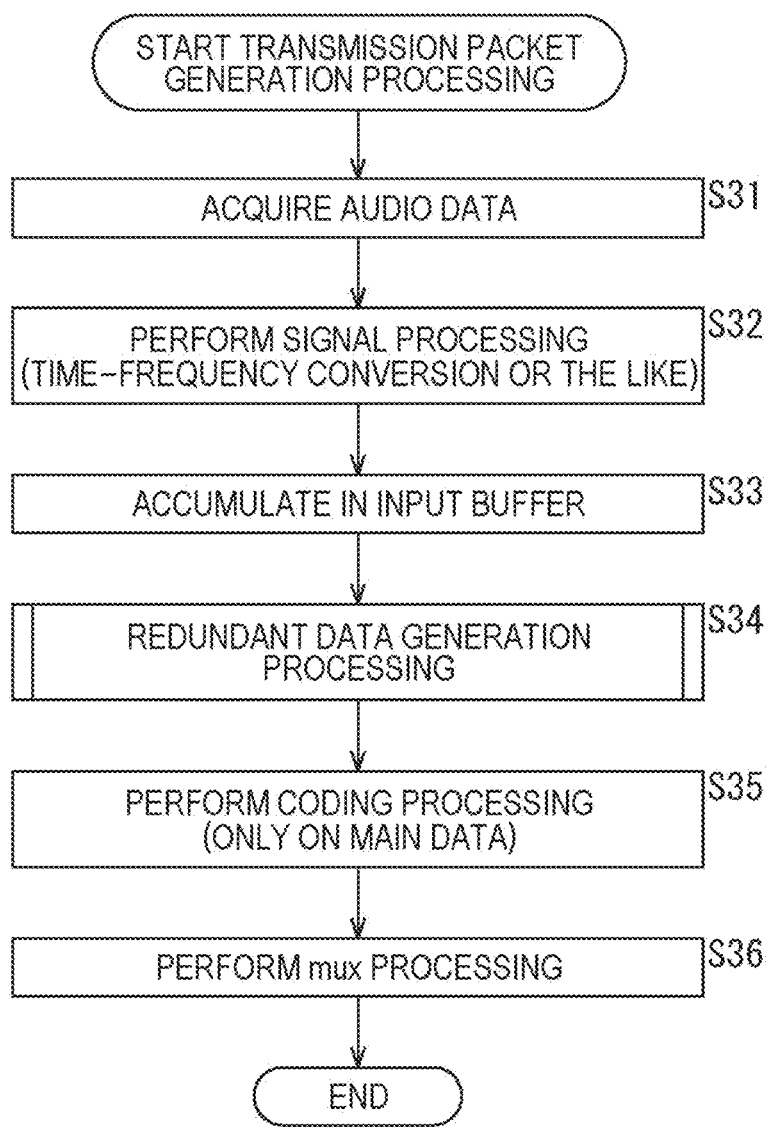
FIG. 9 is a flowchart for describing transmission packet generation processing of the transmission terminal.

FIG. 9 is a flowchart for describing transmission packet generation processing of the transmission terminal 11.

In step S31, the signal processing unit 23 acquires an audio file or audio data from the outside.

In step S32, the signal processing unit 23 performs signal processing such as time-frequency conversion on the audio data.

In step S33, the signal processing unit 23 accumulates data obtained as a result of the signal processing in the input buffer 24.

In step S34, the redundant data generation unit 25 and the coding unit 26 perform redundant data generation processing. Details of redundant data generation processing will be described later with reference to FIG. 10. By the processing of step S34, generation of redundant data and update of the coding setting of the main data are performed.

In step S35, the coding unit 26 performs coding processing on the main data on the basis of the coding setting of the main data. The coding unit 26 outputs the coded main data and redundant data to the mux unit 27.

In step S36, the mux unit 27 performs mux processing. Specifically, the mux unit 27 stores the coded main data and redundant data supplied from the coding unit 26 in a packet suitable for BLE communication.

The mux unit 27 accumulates the packet in the transmission buffer 28 for BLE communication, and the transmission packet generation processing ends. Thereafter, the packet is transmitted to the reception terminal 12 by BLE communication.

<Redundant Data Generation Processing>

Figure 10:
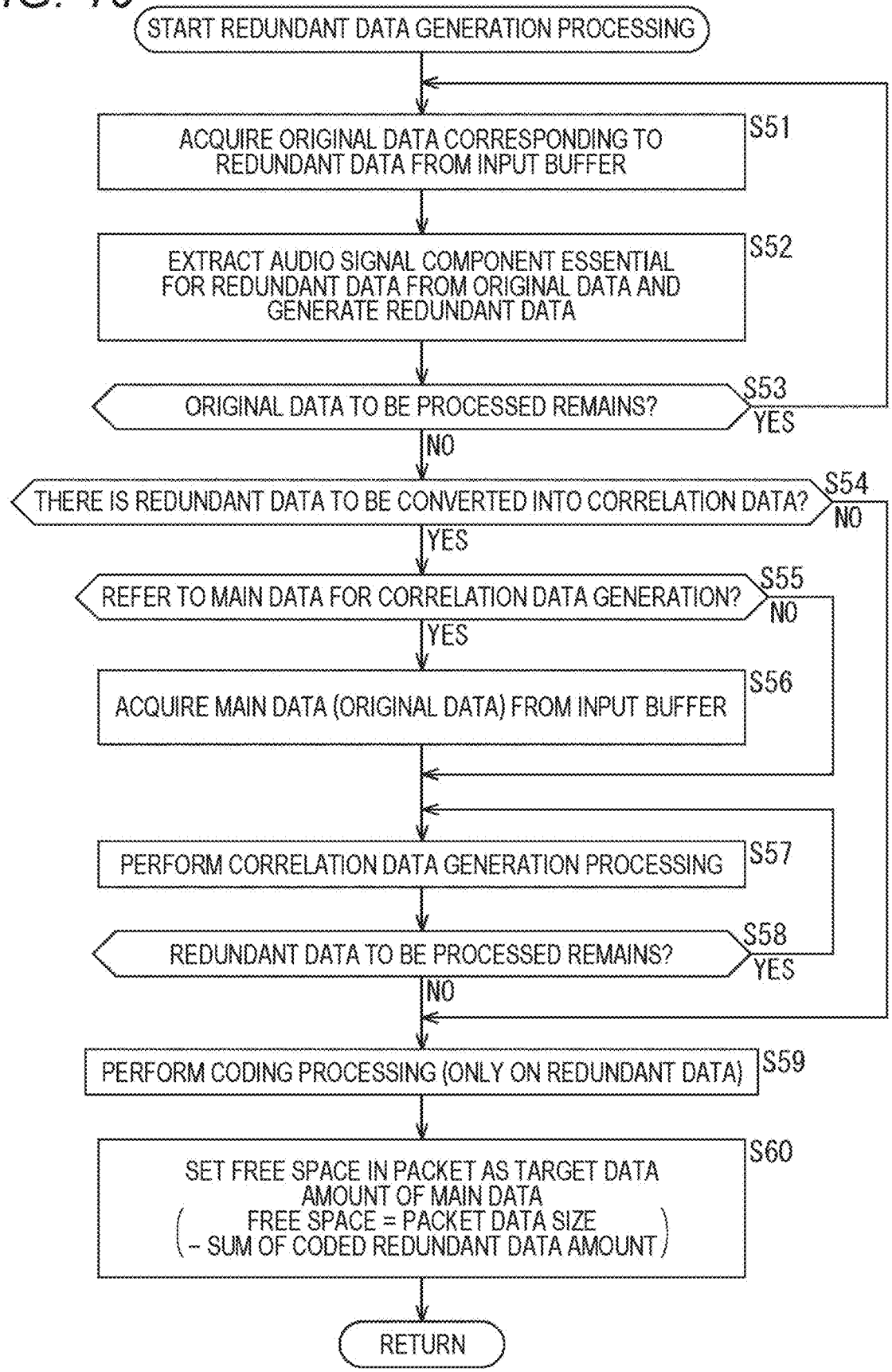
FIG. 10 is a flowchart for describing redundant data generation processing in step S34 in FIG. 9.

FIG. 10 is a flowchart for describing redundant data generation processing in step S34 of FIG. 9.

In step S51, the redundant data generation unit 25 acquires one piece of original data corresponding to the redundant data from the input buffer 24.

In step S52, the redundant data generation unit 25 extracts an audio signal component essential for redundant data from the acquired original data, and generates redundant data.

Here, an audio signal component essential for redundant data in the original data is determined on the basis of a preset table or calculation formula corresponding to the coding setting determined in step S14 in FIG. 7, or a feature amount such as waveform information of the data. At that time, the audio signal component essential for redundant data is determined so that deterioration is hardly perceived even if the audio signal component is replaced with original data during reproduction.

Additionally, processing of deleting components other than the essential audio signal components on the basis of the coding setting, such as excluding the components from the coding target in the coding processing in the frequency spectrum of the main data, greatly reduces redundant data to be coded in the subsequent stage.

In step S53, the redundant data generation unit 25 determines whether or not original data to be processed remains in the input buffer 24. If it is determined in step S53 that original data to be processed remains in the input buffer 24, the processing returns to step S51, and the processing in step S51 and subsequent steps is repeated.

If it is determined in step S53 that there is no original data to be processed in the input buffer 24, the processing proceeds to step S54.

In step S54, the redundant data generation unit 25 determines whether or not there is redundant data to be converted into correlation data. If it is determined in step S54 that there is redundant data to be converted into correlation data, the processing proceeds to step S55.

Here, correlation data is data regarding a correlation between main data and redundant data or pieces of redundant data in a packet. Since it is assumed that pieces of generated redundant data have a time-series correlation, it is also possible to code only correlation data as necessary.

In step S55, the redundant data generation unit 25 determines whether or not to refer to main data for correlation data generation. If it is determined to refer to main data for correlation data generation in step S55, the processing proceeds to step S56.

In step S56, the redundant data generation unit 25 acquires the main data (since processing is not performed, the original data as it is) from the input buffer 24.

If it is determined in step S55 to not refer to main data for correlation data generation, the processing in step S56 is skipped and the processing proceeds to step S57.

In step S57, the redundant data generation unit 25 performs correlation data generation processing and generates correlation data corresponding to the redundant data. Hereinafter, the correlation data is treated as new redundant data. Note that at this time, it is not always necessary to completely restore the original redundant data from the correlation data as long as the redundant data is within an acceptable range in terms of sound quality.

In step S58, the redundant data generation unit 25 determines whether or not redundant data to be processed remains. If it is determined in step S58 that redundant data to be processed remains, the processing returns to step S57, and the processing in step S57 and subsequent steps is repeated.

If it is determined in step S58 that there is no redundant data to be processed, the processing proceeds to step S59.

Additionally, if it is determined in step S54 that there is no redundant data to be converted into the correlation data, the processing also proceeds to step S59.

In step S59, the coding unit 26 codes the redundant data acquired from the redundant data generation unit 25 on the basis of the coding setting of the redundant data determined in step S14 of FIG. 7. That is, the redundant data is coded so as to fall within the target data amount.

In step S60, the redundant data generation unit 25 updates the target data amount of the main data with free space in the packet. Free space in the packet is packet data size—sum of coded redundant data amount. At this time, since the target data amount of the main data is updated, the coding setting of the main data is updated so as to fall within this data amount. After step S60, the redundant data generation processing ends.

<Details of Processing in Step S60 of FIG. 10>

Figure 11:
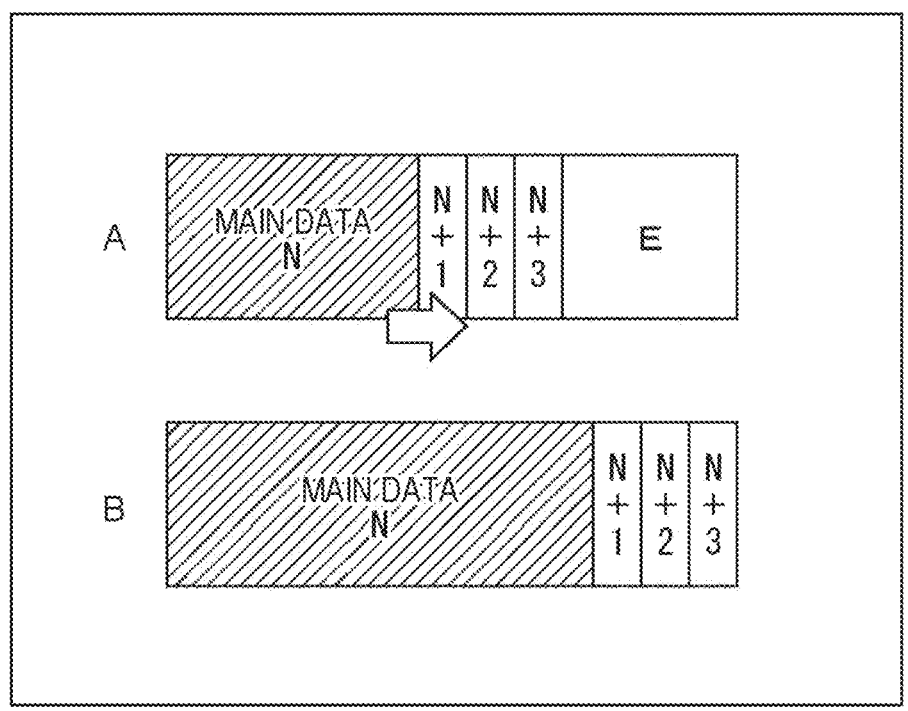
FIG. 11 is a diagram for describing processing of step S60 in FIG. 10.

FIG. 11 is a diagram for describing the processing of step S60 in FIG. 10.

FIG. 11 illustrates an example in which three pieces of redundant data are generated for main data. That is, A of FIG. 11 and B of FIG. 11 illustrate packets including main data N and redundant data N+1 to N+3.

A of FIG. 11 illustrates an example in which the target data amount of the main data N is set to the target data amount determined in the processing of step S14. Here, depending on the contents of the redundant data, the coding result may be significantly smaller than the target data amount. In such a case, a free space E is generated in the packet as illustrated in A of FIG. 11 by the redundant data coding processing in step S59.

Therefore, in step S60, as indicated by an arrow in A of FIG. 11, the target data amount of the main data N is increased so as to fill the free space E in the packet.

As a result, as illustrated in B of FIG. 11, the target data amount of the main data N increases. Accordingly, main data can be transmitted in the packet with the highest possible quality.

<Configuration Example of Reception Terminal>

Figure 12:
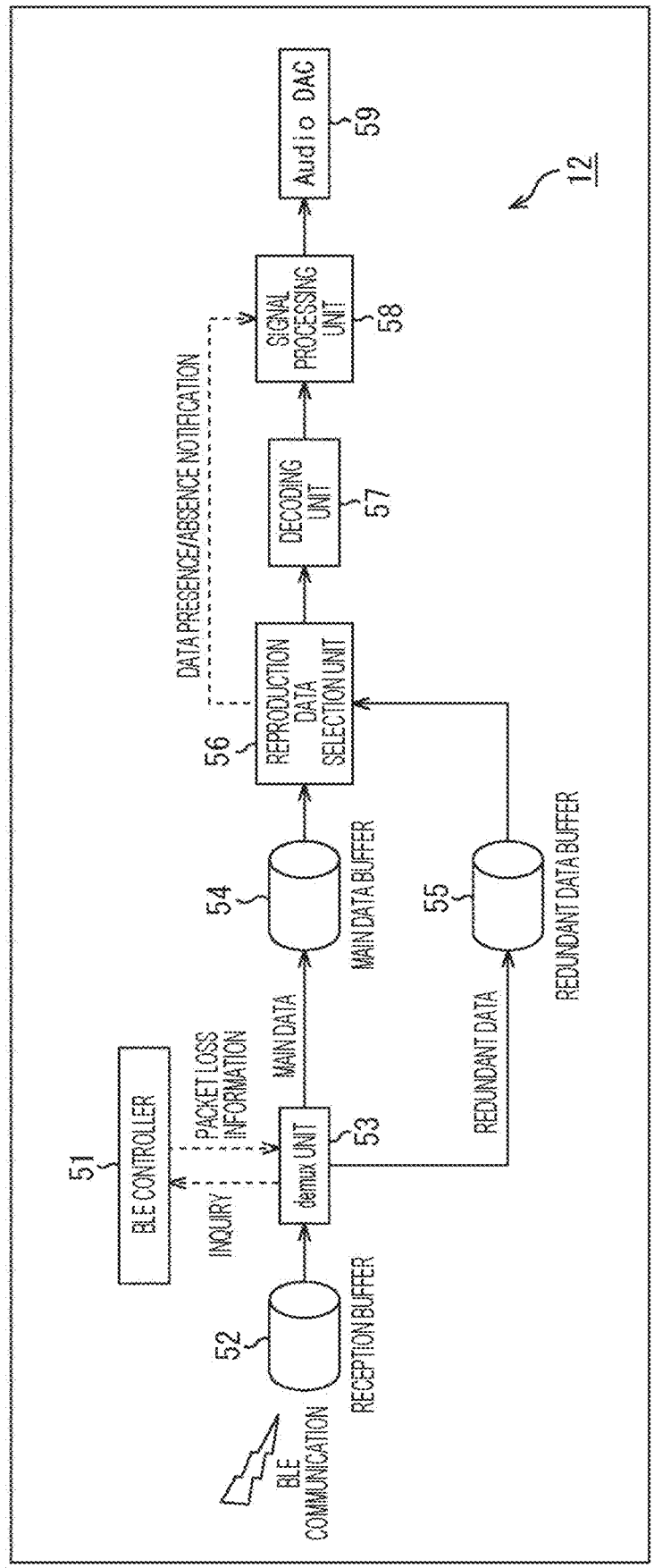
FIG. 12 is a block diagram illustrating a configuration example of a reception terminal.

FIG. 12 is a block diagram illustrating a configuration example of a reception terminal.

The reception terminal 12 includes a BLE controller 51, a reception buffer 52, a demux (demultiplexer) unit 53, a main data buffer 54, a redundant data buffer 55, a reproduction data selection unit 56, a decoding unit 57, a signal processing unit 58, and an audio DAC 59.

The BLE controller 51 controls operations related to BLE communication. The BLE controller 51 counts packet losses due to BLE communication. The BLE controller 21 supplies packet loss information indicating packet loss to the demux unit 53 in response to an inquiry from the demux unit 53.

The reception buffer 52 receives and accumulates packets by BLE communication.

The demux unit 53 acquires the packets accumulated in the reception buffer 52.

The demux unit 53 separates the acquired packet into main data and redundant data. The demux unit 53 adds a data number (frame_id) to each piece of data, accumulates the main data in the main data buffer 54, and accumulates the redundant data in the redundant data buffer 55. The data number is used to identify data selected by the reproduction data selection unit 56.

In a case where there is data (hereinafter referred to as reproduction data) to be reproduced in the main data buffer 54 or the redundant data buffer 55, the reproduction data selection unit 56 acquires the reproduction data and outputs the reproduction data to the decoding unit 57. The reproduction data selection unit 56 notifies the signal processing unit 58 of the presence or absence of reproduction data.

The decoding unit 57 acquires and decodes the main data or one or more pieces of redundant data supplied from the reproduction data selection unit 56. The decoding unit 57 outputs the decoded main data or one or more pieces of redundant data to the signal processing unit 58.

According to the presence or absence of reproduction data notification of which is provided by the reproduction data selection unit 56, in a case where reproduction data exists, the signal processing unit 58 acquires the data from the decoding unit 57 and performs post-processing of decoding on the acquired data. Post-processing of decoding is, for example, signal processing including frequency-time conversion. The processed audio signal is output to a reproduction device in a subsequent stage, such as the audio DAC 59.

The audio DAC 59 converts the digital audio signal supplied from the signal processing unit 58 into an analog audio signal and outputs the analog audio signal to a speaker or the like in a subsequent stage.

<Operation of Reception Terminal>

Hereinafter, the basic processing flow of the reception terminal 12 of the first embodiment will be described separately for data acquisition processing and audio reproduction processing.

<Data Acquisition Processing>

Figure 13:
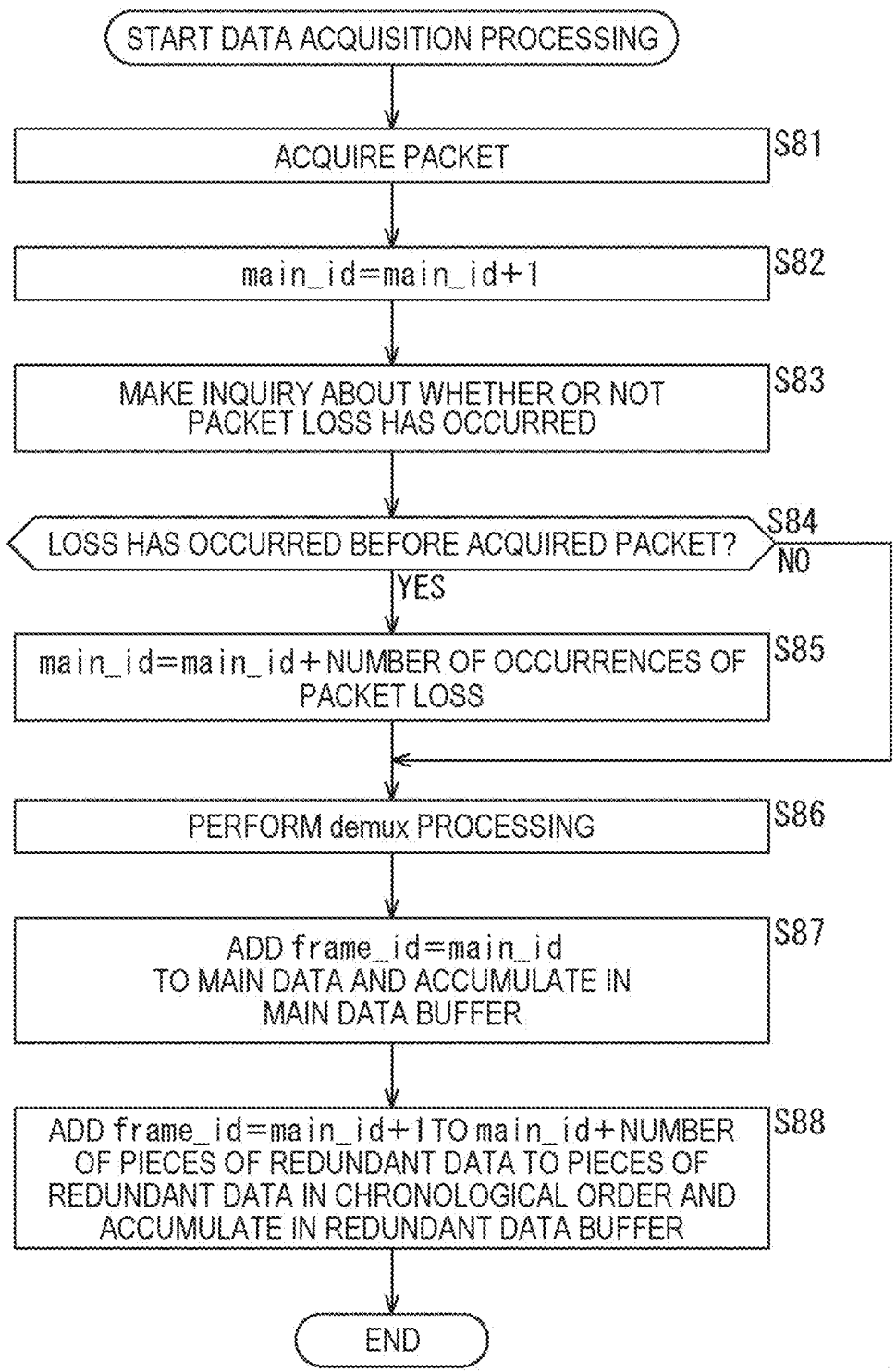
FIG. 13 is a flowchart for describing data acquisition processing of the reception terminal.

FIG. 13 is a flowchart for describing data acquisition processing of the reception terminal 12.

Hereinafter, for convenience of description, it is assumed that data in the reception buffer 52 is in chronological order at the time of start of processing, and redundant data is generated from future original data with respect to the main data.

Additionally, in order to identify data to be reproduced in audio reproduction processing to be described later, the reception terminal 12 adds a data number (frame_id) to each piece of data in chronological order, and counts frame_id using a variable main_id. It is assumed that both frame_id and main_id do not overflow.

In step S81, the demux unit 53 acquires a packet from the reception buffer 52.

In step S82, the demux unit 53 updates main_id to main_id+1, and obtains main_id (frame_id of main data) of the acquired packet. The main_id of the packet obtained here is main_id in a case where no packet loss occurs.

In step S83, the demux unit 53 inquires of the BLE controller 51 about whether or not packet loss has occurred.

In step S84, on the basis of packet loss information acquired from the BLE controller 51, the demux unit 53 determines whether or not packet loss has occurred between the packet acquired last time and the packet acquired this time. If it is determined in step S84 that packet loss has occurred between the packet acquired last time and the packet acquired this time, the processing proceeds to step S85.

In step S85, the demux unit 53 updates main_id to main_id+the number of occurrences of packet loss.

If it is determined in step S84 that no packet loss has occurred between the packet acquired last time and the packet acquired this time, the processing in step S85 is skipped, and the processing proceeds to step S86.

In step S86, the demux unit 53 performs demux processing. Specifically, the demux unit 53 separates the acquired packet into main data and redundant data.

In step S87, the demux unit 53 sets frame_id to be added to the main data to main_id and accumulates the frame_id in the main data buffer 54.

In step S88, the demux unit 53 sets frame_id to be added to the pieces of redundant data to main_id+1 to main_id+the number of pieces of redundant data in chronological order, and accumulates the frame_ids in the redundant data buffer 55. After step S88, the data acquisition processing ends.

<Method of Adding Data Number>

Figure 14:
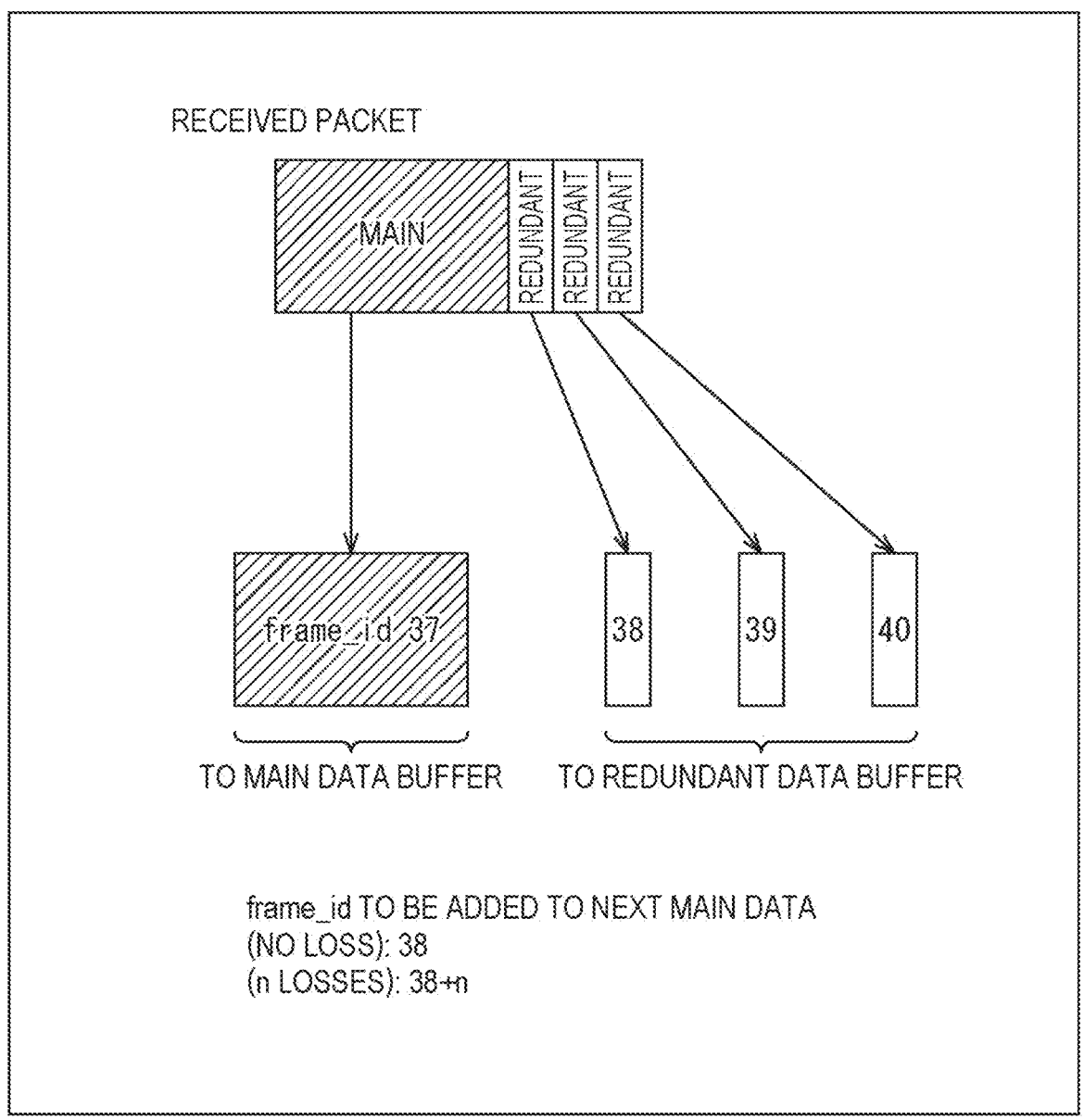
FIG. 14 is a diagram for describing a method of adding a data number.

FIG. 14 is a diagram for describing a method of adding a data number.

FIG. 14 illustrates a received packet received by the reception buffer 52. The received packet includes main data and three pieces of redundant data, and in a case where packet loss has not occurred since the previous reception, main_id=37 is set.

The demux unit 53 sets frame_id to be added to the main data to main_id=37 and accumulates the frame_id in the main data buffer 54.

The demux unit 53 sets frame_id to be added to the pieces of redundant data to main_id+1 (38) to main_id+3 (40) in chronological order, and accumulates the frame_ids in the redundant data buffer 55.

Here, frame_id to be set to the next main data is 38 if packet loss does not occur, and is 38+n if packet loss occurs n times.

<Audio Reproduction Processing>

Figure 15:
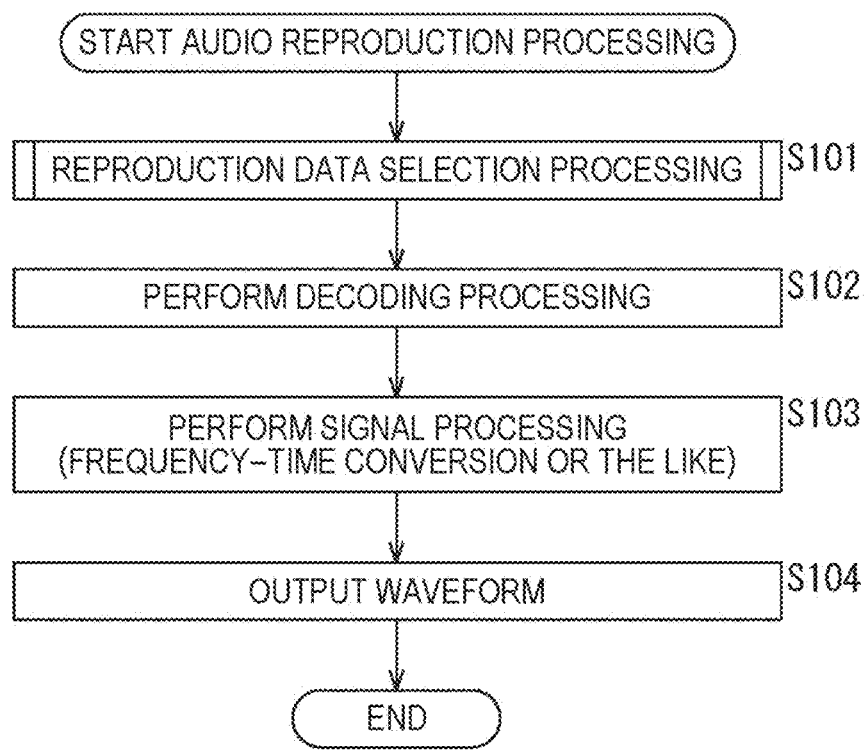
FIG. 15 is a flowchart for describing audio reproduction processing of the reception terminal.

FIG. 15 is a flowchart for describing audio reproduction processing of the reception terminal 12.

In step S101, the reproduction data selection unit 56 performs reproduction data selection processing. Note that details of reproduction data selection processing will be described later with reference to FIG. 16. By the processing of step S101, which one of the main data and the redundant data is to be reproduced is selected according to the occurrence of packet loss. At this time, data for correlation data restoration is also acquired as necessary. The selected data or acquired data is output to the decoding unit 57.

In step S102, the decoding unit 57 performs decoding processing on the data selected by the reproduction data selection unit 56. When the data to be decoded is correlation data, the main data or the redundant data acquired for correlation data restoration in step S101 is also decoded and restored to independently reproducible data. The decoding unit 57 outputs the decoded main data or redundant data to the signal processing unit 58.

In step S103, according to the presence or absence of reproduction data notification of which is provided by the reproduction data selection unit 56, if reproduction data exists, the signal processing unit 58 acquires the data from the decoding unit 57 and performs signal processing such as frequency-time conversion on the acquired data.

In step S104, the signal processing unit 58 outputs a waveform of the processed audio signal in a format that can be received by the audio DAC 59, such as I2S. The audio DAC 59 converts the digital audio signal supplied from the signal processing unit 58 into an analog signal and outputs the analog signal to a speaker or the like in a subsequent stage. After step S104, the audio reproduction processing ends.

<Reproduction Data Selection Processing>

Figure 16:
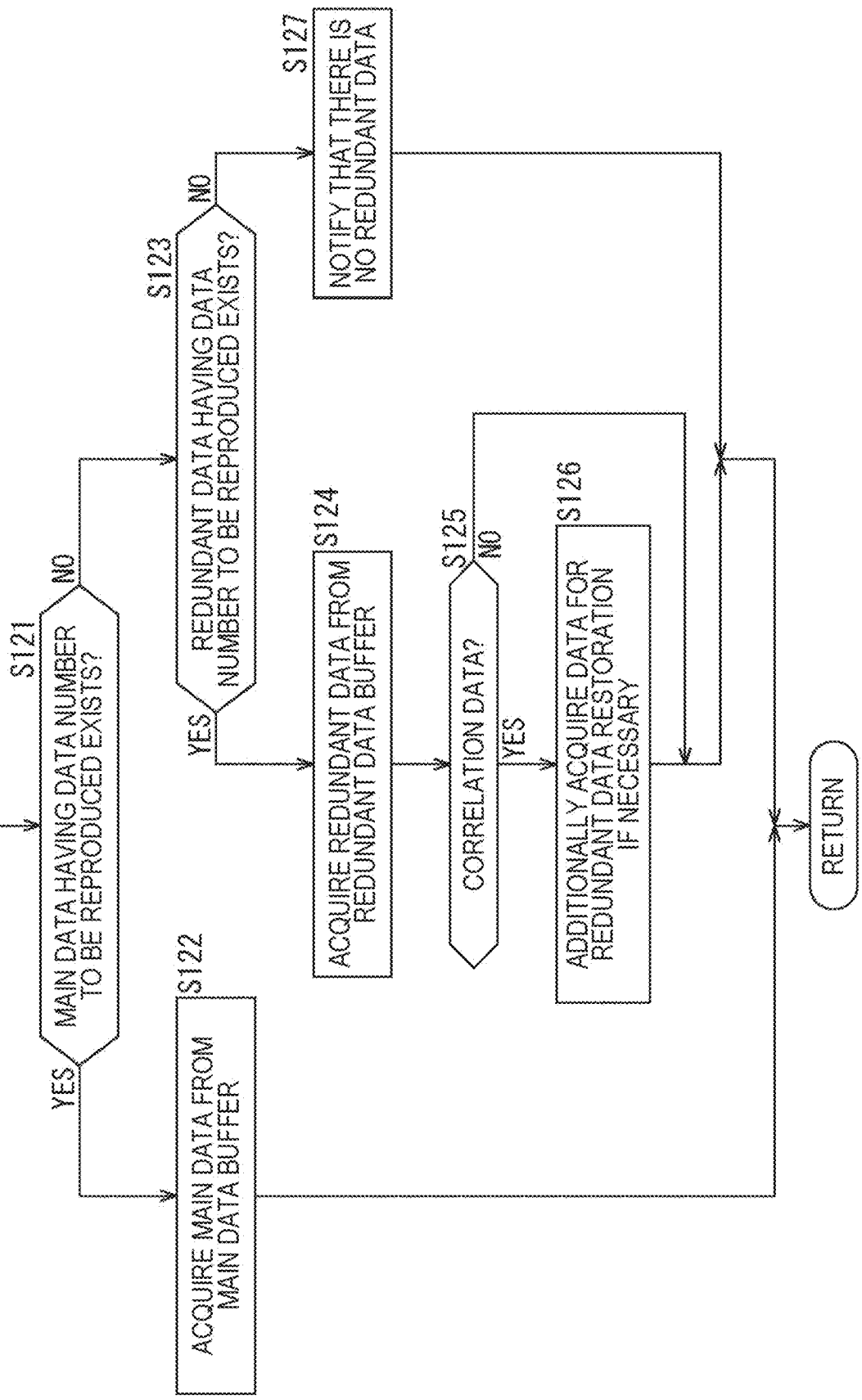
FIG. 16 is a flowchart for describing reproduction data selection processing in step S101 in FIG. 15.

FIG. 16 is a flowchart for describing the reproduction data selection processing in step S101 of FIG. 15.

For convenience of description, it is assumed that frame_id to be reproduced is set so as to be consistent with frame_id added in the data acquisition processing of FIG. 13.

In step S121, the reproduction data selection unit 56 determines whether or not main data having frame_id to be reproduced exists in the main data buffer 54. If it is determined in step S121 that main data having frame_id to be reproduced exists in the main data buffer 54, the processing proceeds to 122.

In step S122, the reproduction data selection unit 56 acquires the main data from the main data buffer 54. After step S122, the reproduction data selection processing ends.

On the other hand, if it is determined in step S121 that there is no main data having frame_id to be reproduced in the main data buffer 54, the processing proceeds to step S123.

In step S123, the reproduction data selection unit 56 determines whether or not redundant data having frame_id to be reproduced exists in the redundant data buffer 55. If it is determined in step S123 that there is redundant data having frame_id to be reproduced in the redundant data buffer 55, the processing proceeds to step S124.

In step S124, the reproduction data selection unit 56 acquires the redundant data from the redundant data buffer 55.

In step S125, the reproduction data selection unit 56 determines whether or not the redundant data is correlation data. If it is determined in step S125 that the redundant data is correlation data, the processing proceeds to step S126.

In step S126, if redundant data for redundant data restoration is also necessary, the reproduction data selection unit 56 additionally acquires the redundant data.

If it is determined in step S125 that the redundant data is not correlation data or after step S126, the reproduction data selection processing ends.

Additionally, if it is determined in step S123 that there is no redundant data having frame_id to be reproduced in the redundant data buffer 55, the processing proceeds to step S127.

In step S127, the reproduction data selection unit 56 notifies the signal processing unit 58 that there is no redundant data. After step S127, the reproduction data selection processing ends.

As described above, according to the first embodiment of the present technology, it is possible to curb variation in the packet loss occurrence probability due to the device in the same communication status. Hence, it is possible to achieve stable voice transmission regardless of the device.

Additionally, since a value determined at the time of connection is used, the invention is also applicable under conditions where dynamic control during transmission is unnecessary or impossible.

<2. Second Embodiment (Combination with Dynamic Control of Data Amount According to Communication Status)

Outline of Second Embodiment

A second embodiment of the present technology can be used in combination with the method described in Patent Document 2.

In the method described in Patent Document 2, the number of pieces of transmission standby data in the transmission buffer is observed at a constant cycle during communication. An effect corresponding to measurement of the communication status can be obtained by observing the number of pieces of transmission standby data. This is for the reason described below.

Normally, when the communication status is good, it is expected that the number of pieces of transmission standby data is reduced. On the other hand, when the communication status is bad and retransmission is repeated, it is expected that the number of pieces of transmission standby data increases. Accordingly, it can be determined that the communication status tends to be bad when the number of pieces of transmission standby data is large, and the communication status tends to be good when the number of pieces of transmission standby data is small.

Hence, in a case where it is determined that the number of pieces of transmission standby data is large (Condition 1), the number of pieces of data to be stored in one packet is increased by reducing the data amount per frame. As a result, the effective retransmittable time of each piece of data is extended, and the probability of successful transmission is increased.

On the other hand, in a case where it is determined that the number of pieces of transmission standby data is small (Condition 2), the number of data to be stored in one packet is reduced by increasing the amount of data per frame. As a result, while the effective retransmittable time of each piece of data becomes short, it is possible to transmit data with as high quality as possible in the current communication status.

The second embodiment of the present technology is obtained by applying the above-described method to the first embodiment, and has the following two points.

The first point is that the number of pieces of main data and the number of pieces of redundant data stored in a packet can be set according to the communication status using the retransmission timeout period and the number of packets (or number of pieces of main data) accumulated in the transmission buffer.

The second point is that the method described in Patent Document 2 can be optimized for each device by changing a threshold for determining whether the number of packets in the transmission buffer is large (Condition 1) or small (Condition 2) according to the retransmission timeout period.

The retransmission timeout period is literally a "retransmittable time". In a case where the retransmission timeout period is short, the probability of successful transmission is likely to decrease when the communication status deteriorates. In this case, by making it easy to satisfy Condition 1, control is performed as sensitive as possible to increase the number of pieces of main data per packet in response to the change in the communication status. As a result, the probability of successful transmission is increased, and packet loss is less likely to occur.

In a case where the reproduction timeout period is relatively long, it is predicted that the probability of successful transmission is high even when the communication status deteriorates as compared with a case where the retransmission timeout period is short. Accordingly, by making it difficult to satisfy Condition 1 and easy to satisfy Condition 2, reproduction is performed with priority on reproduction quality as much as possible.

Note that hereinafter, it is assumed that one or more pieces of main data are stored for one packet according to the operation principle of the second embodiment of the present technology. Other assumptions are similar to those of the first embodiment.

The configuration of an audio transmission system of the second embodiment is similar to that of the audio transmission system of the first embodiment illustrated in FIG. 5. Additionally, a reception terminal 12 of the second embodiment also has a configuration similar to that of the reception terminal 12 of the first embodiment.

Accordingly, in the second embodiment, only the configuration of a transmission terminal 11 different from that of the transmission terminal 11 of the first embodiment will be described.

<Configuration Example of Transmission Terminal>

Figure 17:
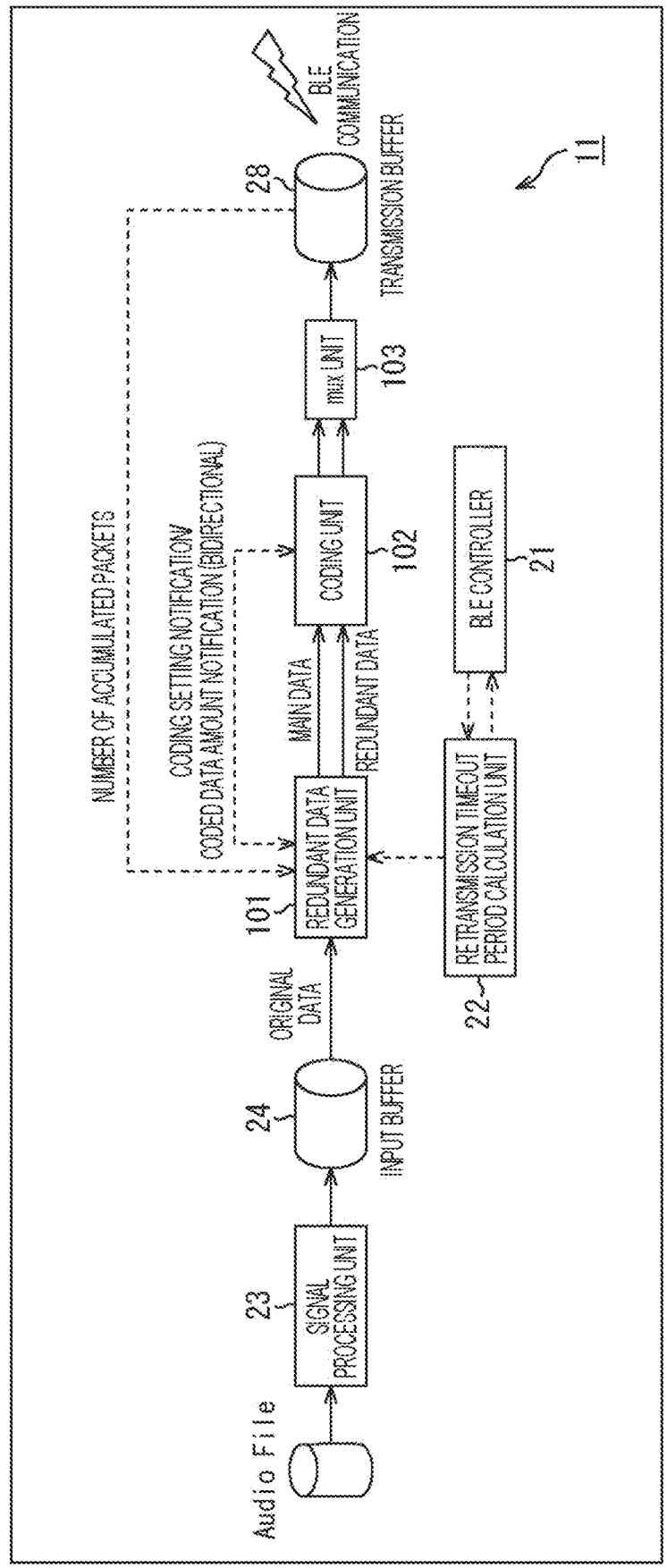
FIG. 17 is a block diagram illustrating another configuration example of the transmission terminal.

FIG. 17 is a block diagram illustrating another configuration example of the transmission terminal 11.

The transmission terminal 11 in FIG. 17 is different from the transmission terminal 11 in FIG. 6 in that the redundant data generation unit 25 is changed to a redundant data generation unit 101, the coding unit 26 is changed to a coding unit 102, and the mux unit 27 is changed to a mux unit 103. Among the configurations illustrated in FIG. 17, the same configurations as those described with reference to FIG. 6 are denoted by the same reference numerals. Overlapping descriptions will be omitted as appropriate.

The redundant data generation unit 101 acquires original data corresponding to main data and redundant data accumulated in an input buffer 24. Additionally, the retransmission timeout period is supplied from a retransmission timeout period calculation unit 22 to the redundant data generation unit 101, and the coded data amount of redundant data is supplied from the coding unit 102.

Moreover, the redundant data generation unit 101 periodically observes a transmission buffer 28 and acquires the number of accumulated packets.

The redundant data generation unit 101 determines the redundancy degree on the basis of the retransmission timeout period supplied from the retransmission timeout period calculation unit 22. The redundant data generation unit 101 generates one or more pieces of main data and redundant data necessary for generating one packet on the basis of the coded data amount notification of which is provided by the coding unit 102, the number of accumulated packets in the transmission buffer 28, and the determined redundancy degree.

The redundant data generation unit 101 outputs the generated one or more pieces of main data and redundant data to the coding unit 102. Additionally, the redundant data generation unit 101 determines the coding setting corresponding to the main data and the redundant data output to the coding unit 102, and notifies the coding unit 102 of the determined coding setting.

The coding unit 102 codes the main data and the redundant data on the basis of the acquired coding setting. The coding unit 102 outputs the coded main data and redundant data to the mux unit 103. Additionally, the coding unit 102 outputs the coded data amount of the redundant data to the redundant data generation unit 101.

The mux unit 103 performs mux processing on the coded one or more pieces of main data and redundant data supplied from the coding unit 102. That is, the mux unit 103 stores the coded one or more pieces of main data and redundant data in a packet suitable for BLE communication. The mux unit 103 accumulates packets in the transmission buffer 28 for BLE communication.

<Operation of Transmission Terminal>

Hereinafter, the basic processing flow of the transmission terminal 11 of the second embodiment will be described separately for system setting processing, setting update processing, and transmission packet generation processing. System setting processing is processing performed only once at the time of connection of BLE communication. Transmission packet generation processing is processing performed a plurality of times during voice transmission by BLE communication.

Setting update processing is processing performed at an observation interval of a predetermined fixed time, such as every 20 ms, in parallel with transmission packet generation processing. With this processing, the number of pieces of main data and the number of pieces of redundant data dynamically change in accordance with the change in the communication status.

<System Setting Processing>

Figure 18:
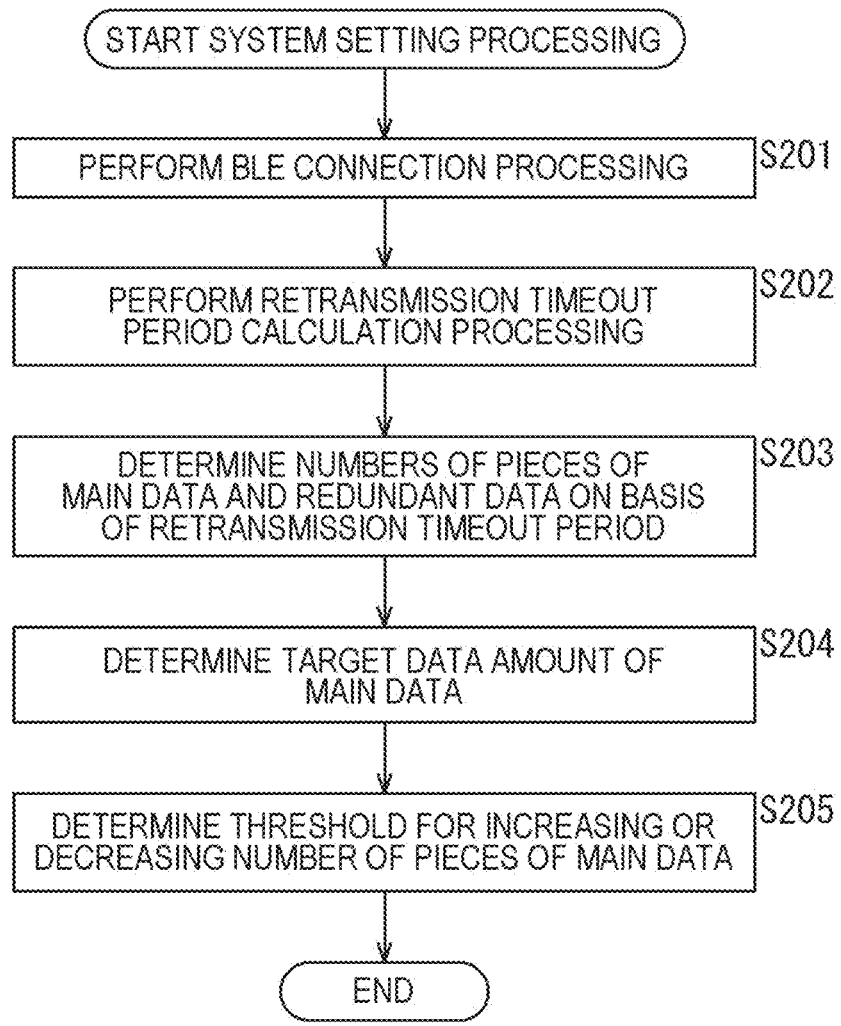
FIG. 18 is a flowchart for describing system setting processing of the transmission terminal.

FIG. 18 is a flowchart for describing system setting processing of the transmission terminal 11.

Since steps S201 and 202 are basically the same processing as steps S11 and S12 in FIG. 7, the description thereof will be omitted.

In step S203, the redundant data generation unit 101 determines the number of pieces of main data and the number of pieces of redundant data (redundancy degree) on the basis of the retransmission timeout period supplied from the retransmission timeout period calculation unit 22. The number of pieces of main data and the number of pieces of redundant data are determined by using a relational expression or a table that is prepared in advance and indicates a correspondence between the retransmission timeout period, and the number of pieces of main data and the number of pieces of redundant data.

In step S204, the redundant data generation unit 101 determines the target data amount of the main data on the basis of the determined number of pieces of main data and the determined number of pieces of redundant data. Additionally, in step S204, when the target data amount of the main data is determined, the coding setting of the main data and the coding setting of the redundant data are determined so as to fall within the target data amount.

While the above-described processing is similar to the processing in step S14 in FIG. 7, since the number of pieces of main data is one or more, the target data amount of one piece of main data is obtained by dividing the remainder obtained by subtracting the sum of the target data amounts of the redundant data from the packet data size by the number of pieces of main data.

Note that the table for determining the numbers of pieces of data and the target data amount of the redundant data used in steps S203 and S204 are set such that the target data amount of the main data always exceeds the target data amount of the redundant data.

In step S205, the redundant data generation unit 101 determines a threshold th1 and a threshold th2 (th1>th2) for determining an increase or decrease in the number of pieces of main data used in setting update processing to be described later. These thresholds may be set to certain fixed default values, or, from the above-described advantage, may be set on the basis of a calculation formula or a table indicating a correspondence relationship between the retransmission timeout period and the threshold prepared in advance. After step S205, the system setting processing ends.

<Calculation of Target Data Amount>

Figure 19:
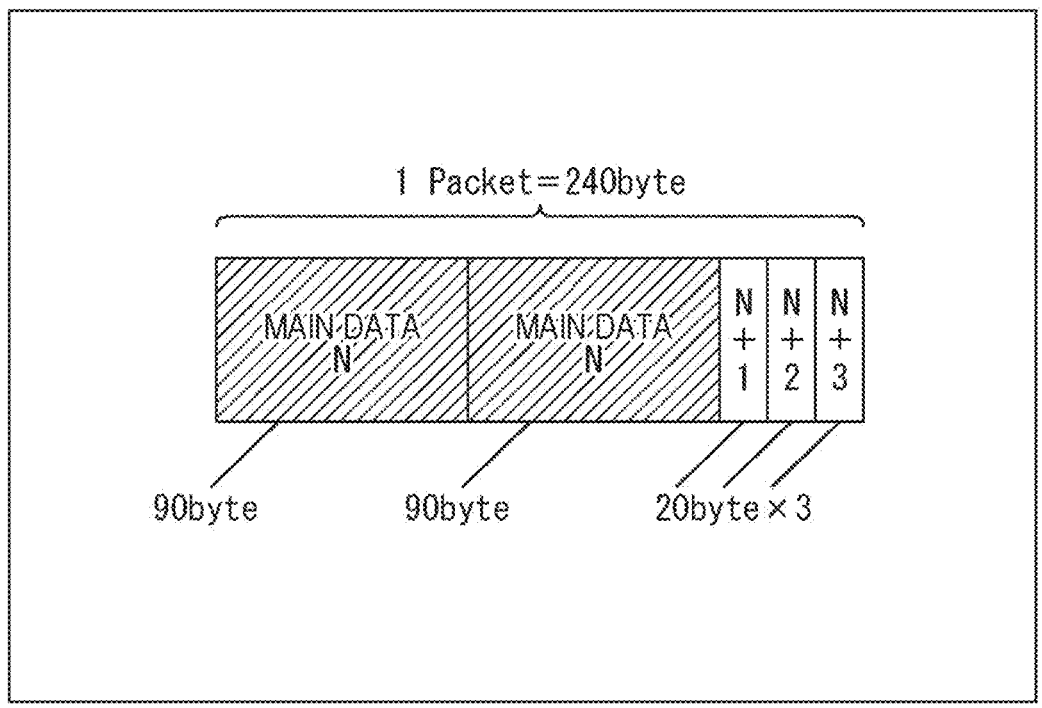
FIG. 19 is a diagram illustrating a specific example of calculation of a target data amount.

FIG. 19 is a diagram illustrating a specific example of calculation of the target data amount.

FIG. 19 illustrates one packet. For example, as illustrated in FIG. 19, in a case where the number of pieces of main data is two, the number of pieces of redundant data is three, the target data amount of the redundant data is 20 [byte], and the data size of the packet is 240 [byte], the target data amount of the main data is (240−20×3)/2=90 [byte].

<Setting Update Processing>

Figure 20:
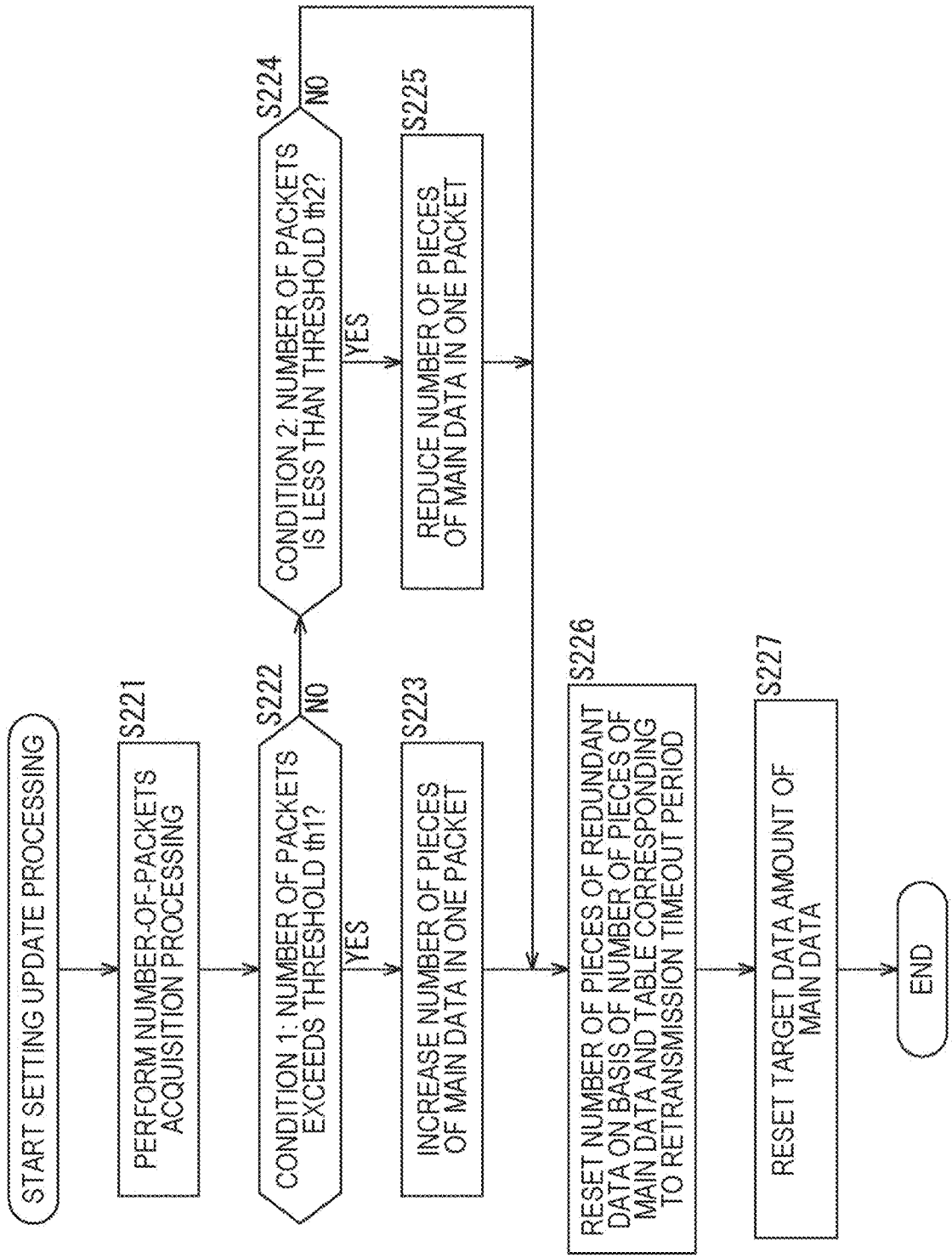
FIG. 20 is a flowchart for describing setting update processing of the transmission terminal.

FIG. 20 is a flowchart for describing setting update processing of the transmission terminal 11.

In step S221, the redundant data generation unit 101 acquires the number of packets accumulated in the transmission buffer 28.

In step S222, the redundant data generation unit 101 determines whether or not the number of packets of the transmission buffer 28 exceeds the threshold th1 as Condition 1. If it is determined in step S222 that the number of packets of the transmission buffer 28 exceeds the threshold th1, the communication status is assumed to be bad, and thus the processing proceeds to step S223.

In step S223, the redundant data generation unit 101 increases the number of pieces of main data in one packet.

Additionally, if it is determined in step S222 that the number of packets of the transmission buffer 28 does not exceed the threshold th1, the processing proceeds to step S224.

In step S224, as Condition 2, it is determined whether or not the number of packets in the transmission buffer 28 is less than the threshold th2. If it is determined in step S224 that the number of packets of the transmission buffer 28 is less than the threshold th2, the communication status is assumed to be good, and thus the processing proceeds to step S225.

In step S225, the redundant data generation unit 101 reduces the number of pieces of main data in one packet.

After step S223 or step S225, the processing proceeds to step S226.

On the other hand, if it is determined in step S224 that the number of packets of the transmission buffer 28 is not less than the threshold th2, too, the processing proceeds to step S226. In this case, the number of pieces of main data in the packet is not changed.

Note that the determination of Condition 1 and Condition 2 does not necessarily need to be comparison with a set threshold, and for example, past information such as the number of packets of the transmission buffer in the past or transition of a set number of pieces of main data may be used as the threshold. Additionally, either one of a set threshold and a threshold including past information may be used, or both of the set threshold and the threshold may be used, such as a case where the current number of packets is n and is equal to or more than m which is the average of the past number of packets.

In step S226, the redundant data generation unit 101 resets the number of pieces of redundant data on the basis of the number of pieces of main data and the table indicating the correspondence relationship between the retransmission timeout period and the number of pieces of redundant data.

For example, in a case where the number of pieces of main data stored in one packet increases, the number of pieces of redundant data required at the time of packet loss also increases, and thus, the processing of step S226 is performed as necessary.

Note that when the number of pieces of redundant data is reset, the redundant data generation unit 101 may determine the number of pieces of redundant data in consideration of a transition history of the number of pieces of main data, the number of pieces of main data scheduled in the next packet, and other information.

In step S227, the redundant data generation unit 101 resets the target data amount of the main data.

The target data amount of the main data is obtained on the basis of the number of pieces of main data, the number of pieces of redundant data, the target data amount of the redundant data, and the data size of the packet, similarly to the processing of step S204 in FIG. 18. Additionally, in step S227, when the target data amount of the main data is determined, the coding setting of the main data and the coding setting of the redundant data are updated so as to fall within the target data amount.

After step S227, the setting update processing ends.

<Transmission Packet Generation Processing>

Figure 21:
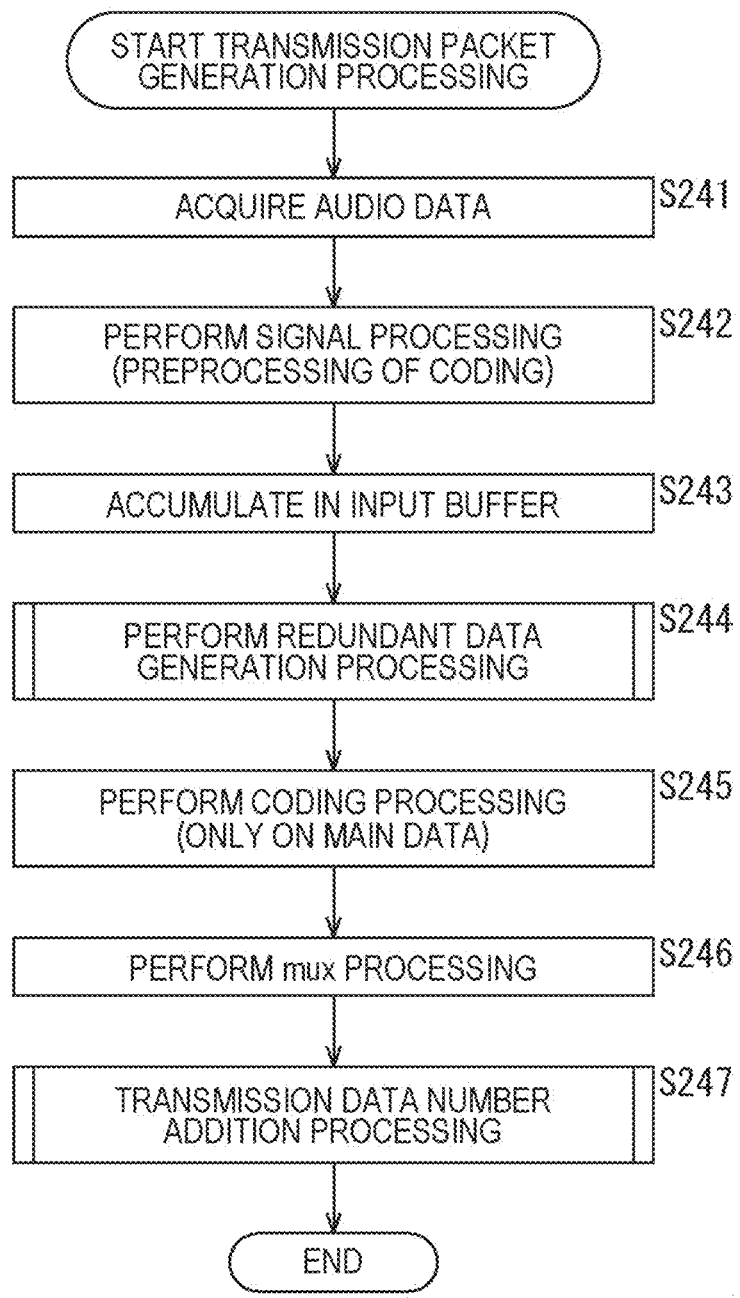
FIG. 21 is a flowchart for describing transmission packet generation processing of the transmission terminal.

FIG. 21 is a flowchart for describing transmission packet generation processing of the transmission terminal 11.

Note that since steps S241 to S246 in FIG. 21 are basically similar to steps S31 to S36 in FIG. 9, the description thereof will be omitted.

Note, however, that in steps S244 to S246, as described later with reference to FIG. 22, the number of pieces of main data to be coded and stored is one or more. For example, in step S244, since the number of pieces of main data is one or more, a value obtained by dividing the free space by the number of pieces of main data is set as the target data amount of the main data.

In step S247 of FIG. 21, the mux unit 103 adds a transmission data number (send_id) to the packet. A transmission data number is a number used to calculate the data number (frame_id) described above in the first embodiment. Details of the transmission data number addition processing will be described later with reference to FIG. 23.

The mux unit 103 accumulates the packet to which the transmission data number is added in the transmission buffer 28 for BLE communication, and the transmission packet generation processing ends. Thereafter, the packet is transmitted to the reception terminal 12 by BLE communication.

<Configuration Example of Frame and Packet>

Figure 22:
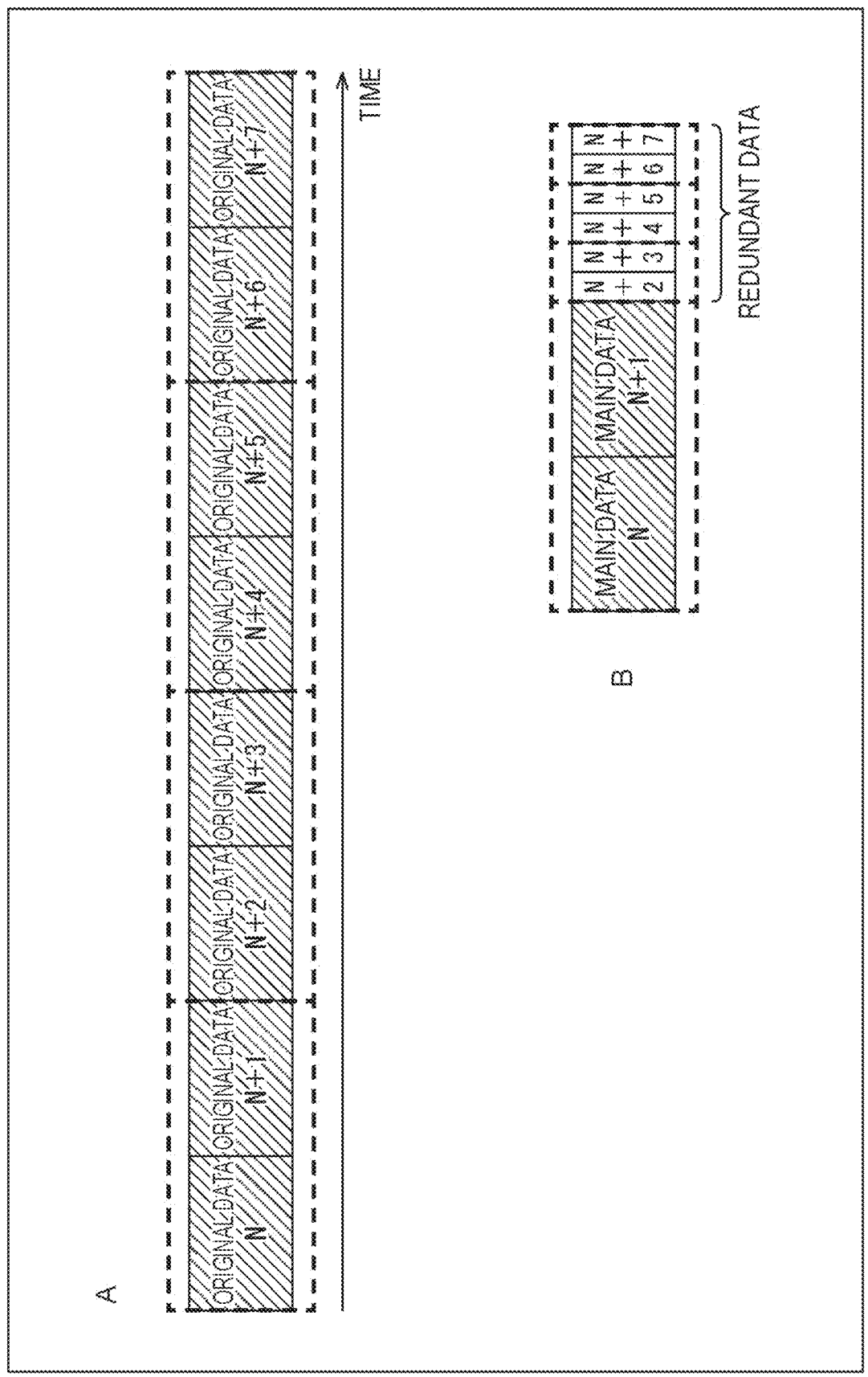
FIG. 22 is a diagram illustrating configurations of a frame and a packet in a case where there is one or more pieces of main data.

FIG. 22 is a diagram illustrating configurations of a frame and a packet in a case where there is one or more pieces of main data.

In A of FIG. 22, frames of original data N to N+7 are illustrated along a time axis. In a case where the number of pieces of main data per packet is two, two pieces of original data indicated by broken lines are included in one packet.

B of FIG. 22 illustrates a configuration example of a packet in a case where the number of pieces of main data per packet is two.

In a case where the number of pieces of redundant data is for three packets with respect to the main data and the number of pieces of main data per packet is two, the number of pieces of redundant data is six future frames.

Accordingly, the configuration of the packet for transmitting the original data N and N+1 includes the main data N and N+1 and the redundant data N+2 to N+7 of the original data N+2 to N+7.

<Transmission Data Number Addition Processing>

Figure 23:
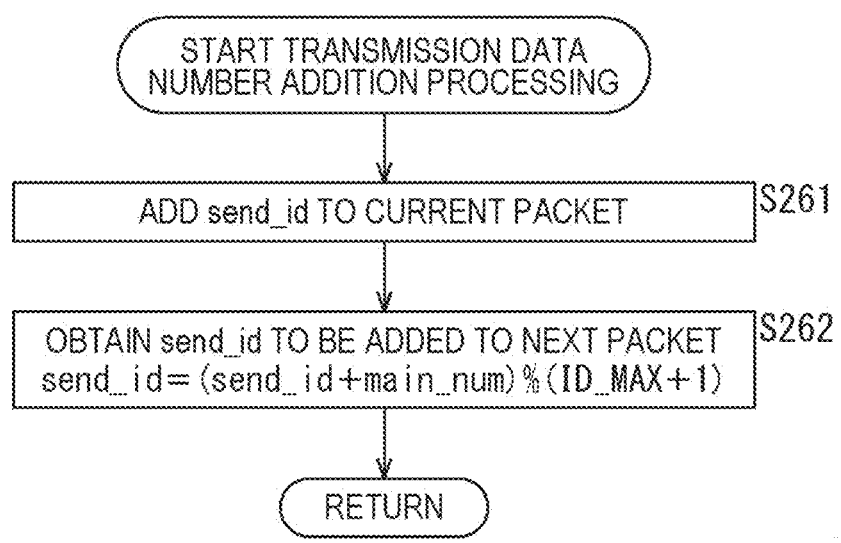
FIG. 23 is a flowchart for describing transmission data number addition processing in step S247 in FIG. 21.

FIG. 23 is a flowchart for describing transmission data number addition processing in step S247 of FIG. 21.

In step S261, the mux unit 103 adds a transmission data number (send_id) to the current packet.

Here, send_id is a value corresponding to the main data at the head of the packet when the pieces of main data stored in the packet are sequentially numbered in time series after the start of reproduction from an initial value of 0. Note that a possible maximum value of send_id is ID_MAX, and when 1 is added to ID_MAX, ID_MAX overflows and becomes 0. Additionally, send_id is information to be added to a packet, and therefore has a minimum necessary bit length. Specifically, the bit length of send_id may be any length as long as it can express the maximum number of pieces of lost data that can be consecutively generated.

Hereinafter, it is assumed that the number of pieces of main data included in the packet is main_num, and that consecutive packet loss of ID_MAX times or more does not occur.

In step S262, the mux unit 103 obtains send_id to be added to the next packet as in the following equation (1).

[Expression 1]

$$\text{send\_id} = (\text{send\_id} + \text{main\_num})\%(\text{ID\_MAX} + 1) \qquad (1)$$

After step S262, the transmission data number addition processing ends.

<Specific Example of Transmission Data Number Addition Processing>

Figure 24:
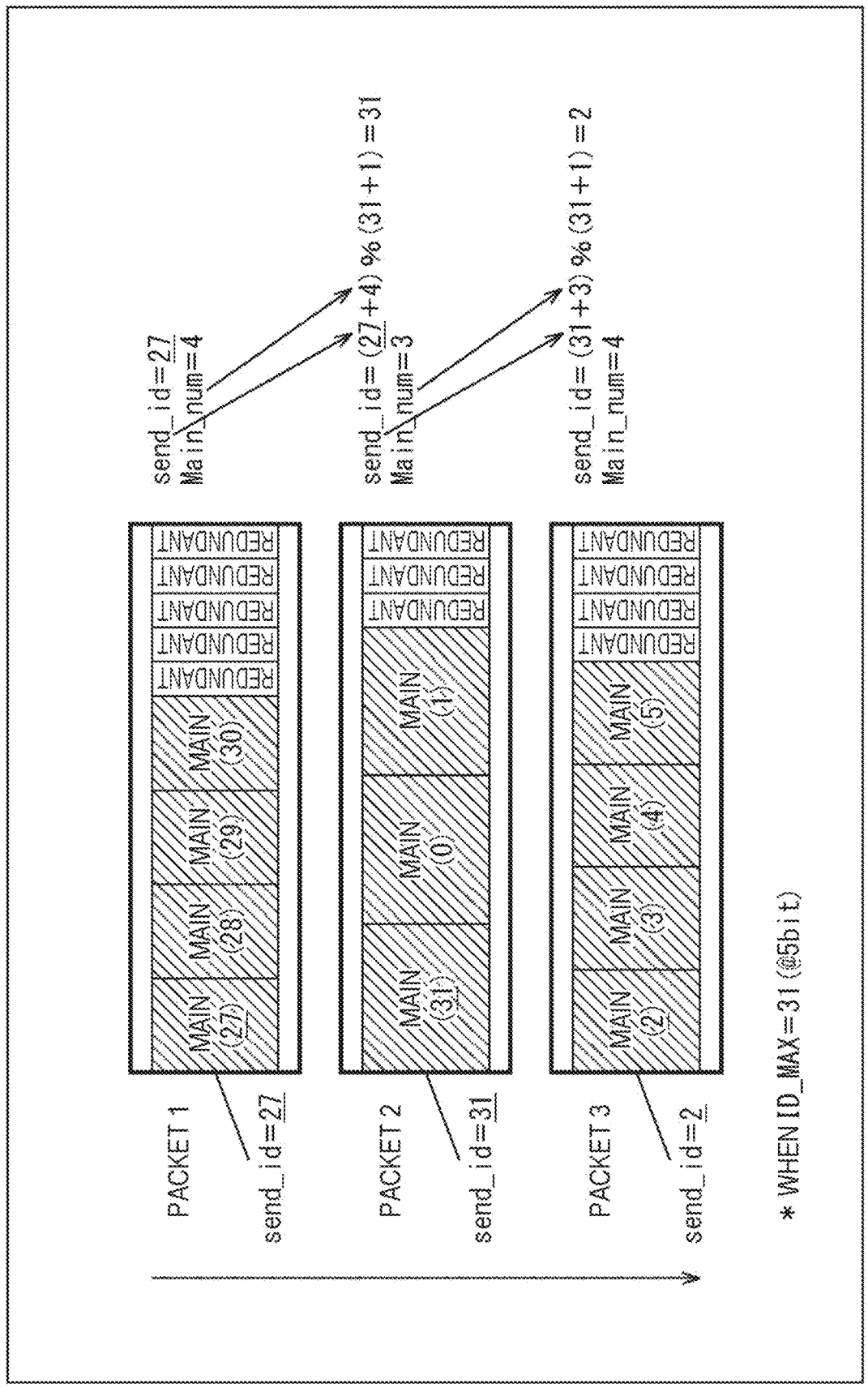
FIG. 24 is a diagram illustrating a specific example of transmission data number addition processing.

FIG. 24 is a diagram illustrating a specific example of transmission data number addition processing.

In FIG. 24, when expressed by 5 bits, send_id takes a value of 0 to 31 and ID_MAX is 31. Additionally, Packets 1 to 3 are obtained by arranging packets to be transmitted in chronological order.

Packet 1 has send_id=27 and main_num (number of pieces of main data)=4. In Packet 1, five pieces of redundant data are added to the packet.

When send_id=27 and main_num (number of pieces of main data)=4 in Packet 1, the next (Packet 2) send_id is (27+4)% (31+1)=31.

Packet 2 has send_id=31 and main_num (number of pieces of main data)=3. In Packet 2, three pieces of redundant data are added to the packet.

When send_id=31 and main_num=3 in packet 2, send_id added to Packet 3 is (31+3)% (31+1)=2.

Packet 3 has send_id=2 and main_num (number of pieces of main data)=4. In Packet 3, four pieces of redundant data are added to the packet.

Thus, send_id is added to all the packets to be transmitted in a similar manner.

<Operation of Reception Terminal>

Hereinafter, in the basic processing flow of the reception terminal 12 of the second embodiment, data acquisition processing including a difference from that of the first embodiment will be described. Note that audio reproduction processing includes operations similar to those of the first embodiment.

In the second embodiment, since the number of pieces of main data stored in one packet varies, the transmission data number send_id is confirmed in calculating the data number frame_id to be added to each piece of received data.

Hereinafter, the transmission data number added to the received packet is send_id, the maximum value thereof is ID_MAX, the number of pieces of included main data is main_num, and a variable indicating send_id of the previous received packet is send_id_before. Additionally, similarly to the example of the first embodiment, a variable indicating frame_id of the main data at the head of the packet is main_id.

Note that for convenience of description, it is assumed that consecutive packet loss of ID_MAX times or more does not occur, redundant data is generated from future original data with respect to main data, and both frame_id and main_id do not overflow.

<Data Acquisition Processing>

Figure 25:
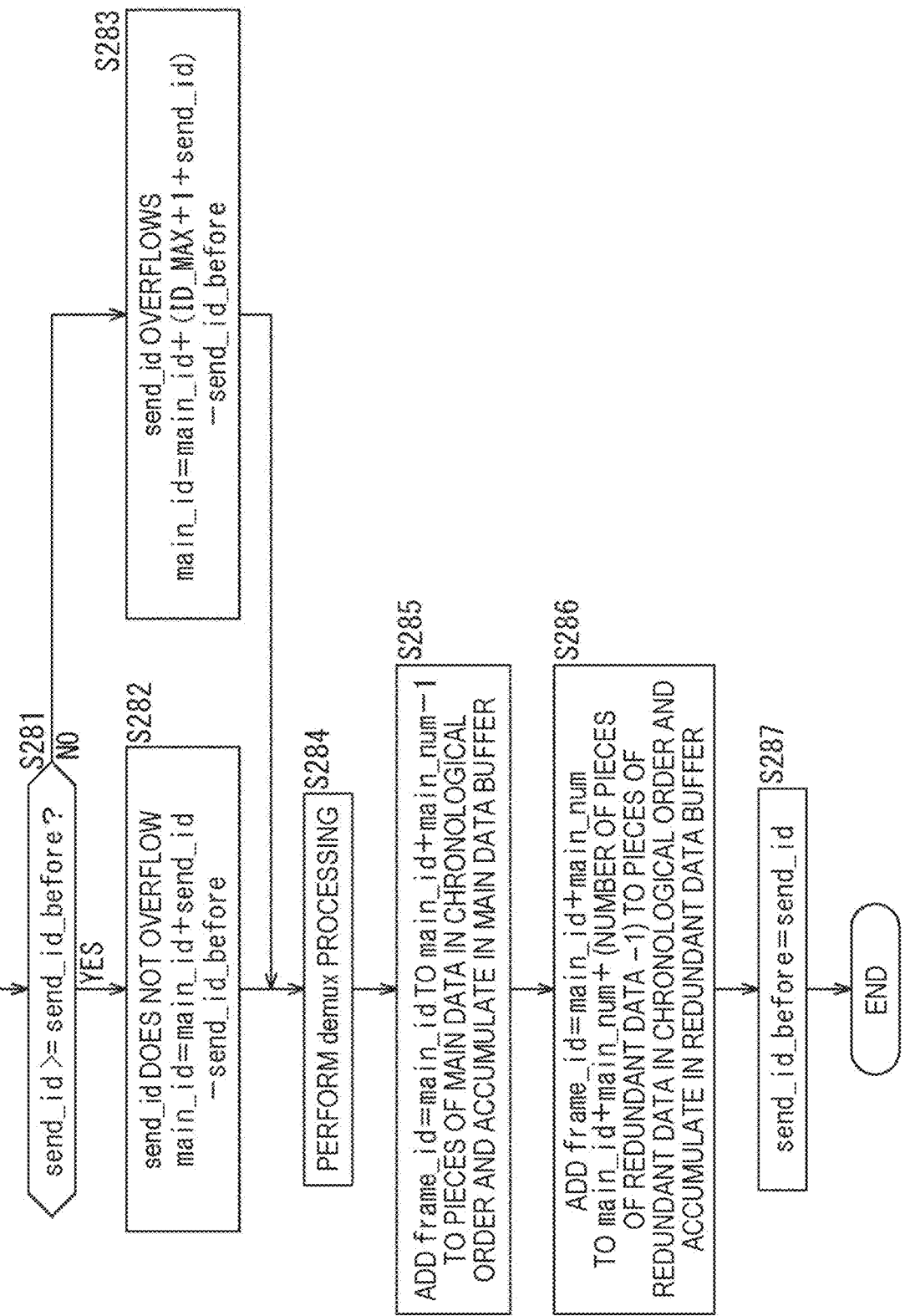
FIG. 25 is a flowchart for describing data acquisition processing of the reception terminal.

FIG. 25 is a flowchart for describing data acquisition processing of the reception terminal 12.

The reception terminal 12 updates main_id by using send_id of the initially received packet. Since the presence or absence of packet loss or the number of pieces of lost data at the time of packet loss is recognized on the basis of send_id, send_id_before, and the number of pieces of main data of the previous packet, it is unnecessary to confirm the presence or absence of packet loss as in steps S83 and S84 described above in the first embodiment.

In step S281, the demux unit 53 determines whether or not send_id of the received packet is equal to or greater than send_id_before. If it is determined in step S281 that send_id is equal to or greater than send_id_before, the processing proceeds to step S282.

In step S282, processing in a case where send_id does not overflow is performed. That is, the demux unit 53 obtains main_id=main_id+send_id−send_id_before.

On the other hand, if it is determined in step S281 that send_id is smaller than send_id_before, the processing proceeds to step S283.

In step S283, processing in a case where send_id overflows is performed. That is, the demux unit 53 obtains main_id=main_id+(ID_MAX+1+send_id)−send_id_before.

After step S282 or S283 ends, the processing proceeds to step S284.

In step S284, the demux unit 53 separates the acquired packet into main data and redundant data as demux processing.

In step S285, the demux unit 53 sets frame_id to be added to the pieces of main data to main_id to main_id+main_num−1 in chronological order, and accumulates the frame_ids in the main data buffer 54.

In step S286, the demux unit 53 sets frame_id to be added to the pieces of redundant data to main_id+main_num to main_id+main_num+(number of pieces of redundant data−1) in chronological order, and accumulates the frame_ids in the redundant data buffer 55.

In step S287, the demux unit 53 updates send_id_before to send_id. After step S287, the data acquisition processing ends.

<Method of Adding Frame_Id>

Figure 26:
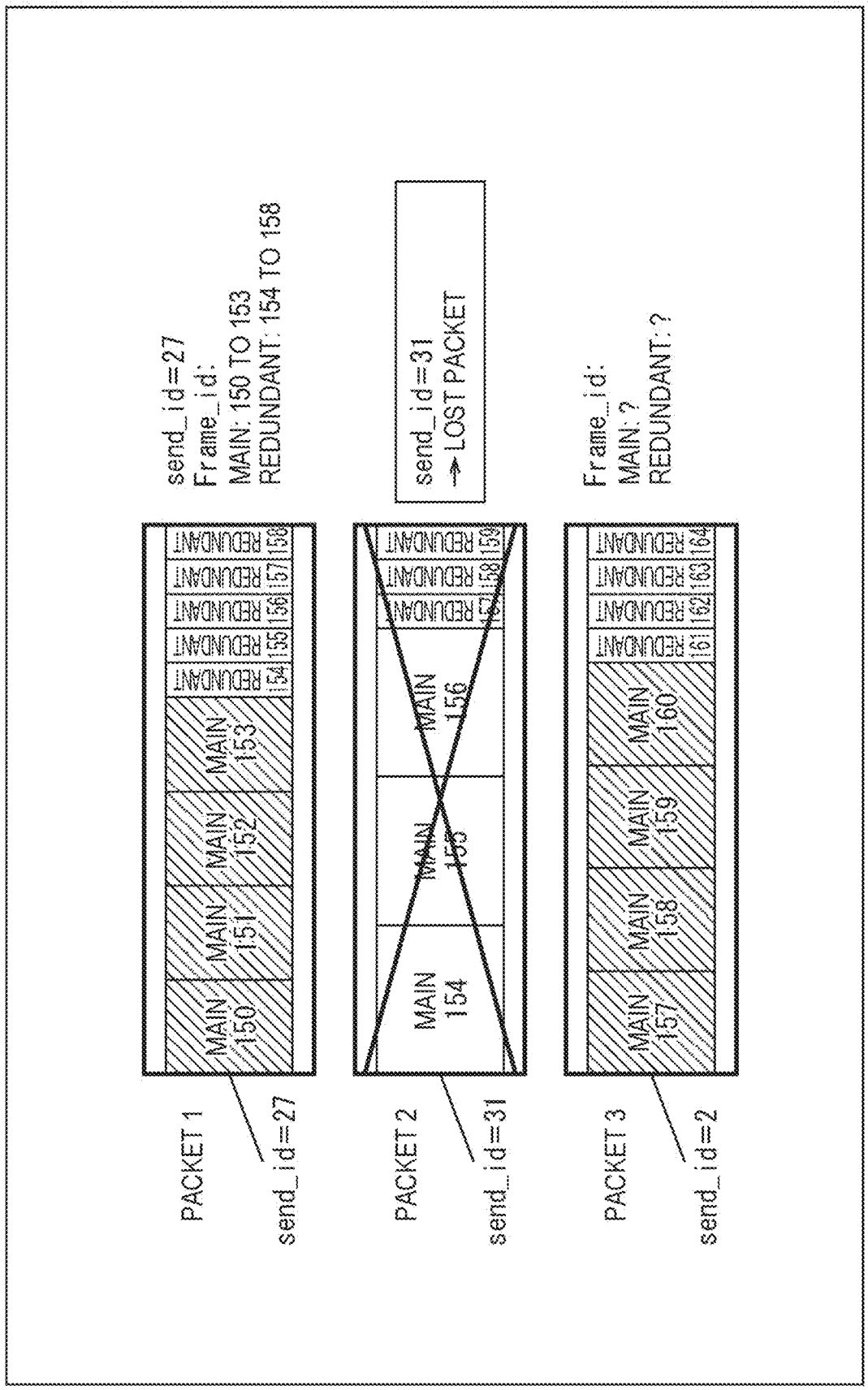
FIG. 26 is a diagram illustrating an example of a method of adding frame_id.

FIG. 26 is a diagram illustrating an example of a method of adding frame_id.

FIG. 26 illustrates a situation in which Packets 1 to 3 are transmitted in the order illustrated in FIG. 24 and Packet 2 is lost during BLE communication. At this time, the demux unit 53 obtains frame_id added to each piece of main data and redundant data of Packet 3.

Packet 1, when received, has send_id=27. The main_id immediately after receiving Packet 1 is a value smaller than 150, and is updated to main_id=150 by the processing of step S282 in FIG. 25 at the time of receiving Packet 1. On the basis of the updated main_id=150, frame_ids to be added to the four pieces of main data are set to 150 to 153, and frame_ids to be added to the five pieces of redundant data are set to 154 to 158.

When Packet 3 is received, the demux unit 53 compares send_id of the received packet (Packet 3) with send_id of the previously received packet (Packet 1). Since send_id=2 and send_id_before (send_id of Packet 1)=27, send_id<send_id_before.

Accordingly, since send_id<send_id_before, when main_id=150 at the time of the previous reception, the demux unit 53 updates main_id to 150+(31+1+2)−27=157 as described above in step S303 of FIG. 25. From this value, frame_id added to the four pieces of main data of Packet 3 is set to 157 to 160, and frame_id added to the four pieces of redundant data is set to 161 to 164.

If the lost Packet 2 had been received with send_id=31, main_id=154 is updated. From this value, frame_id added to the three pieces of main data of Packet 2 is set to 154 to 156, and frame_id added to the three pieces of redundant data is set to 157 to 159.

Note that in the second embodiment, for convenience of description, it is assumed that redundant data is generated from the future original data in chronological order with respect to the main data, and the number of main frames held in the next packet cannot be confirmed.

For this reason, in the examples of FIGS. 24 and 26, in a case where the number of pieces of main data in the packet changes depending on the communication status, a frame in which redundant data overlaps, such as frame_id=157,158 in FIG. 26, or a frame in which redundant data is not prepared, such as frame=160, occurs.

Accordingly, in practice, operation is performed in which the number of pieces of main data of the next packet is determined in advance to set the number of pieces of redundant data to be the same as the number of pieces of main data of the packet to be transmitted next, or redundant data added at least once is not added again. As a result, waste and omission of redundant data are curbed.

As described above, according to the second embodiment of the present technology, it is possible to curb variation in the packet loss occurrence probability due to the device in the same communication status. Hence, it is possible to achieve stable voice transmission regardless of the device.

Additionally, even when a mechanism for checking the communication status and dynamically changing the amount of data is used, sound interruption immediately after the start of connection or the like can be avoided by setting two thresholds to appropriate values in advance.

Moreover, since the threshold for comparing the number of packets in the transmission buffer is changed according to the retransmission timeout period, it is possible to perform appropriate control according to a device sensitive to change in the communication status or a device that is not sensitive to change in the communication status.

3. Third Embodiment (Control in One-To-Many Communication)

Outline of Third Embodiment

In actual voice transmission using BLE, one transmission terminal may communicate with a plurality of reception terminals, such as fully wireless earphones. In a third embodiment, an example in which the present technology is applied to such a case will be described.

Additionally, normally, a device such as fully wireless earphones often performs control and communicates audio signals between devices with a dedicated scheme as inter-device communication. Since redundant data used in the present technology is a part of the coding scheme and does not depend on the type of the communication scheme, redundant data can also be used for communication in a dedicated scheme.

For this reason, by adding the redundant data of the present technology to inter-device data for performing inter-device communication and transmitting and receiving the data between reception terminals, the possible range of concealment can be expanded as compared with the reception terminal alone.

In order to achieve the above control, in the third embodiment, processing of requesting necessary data between reception terminals is added. Details will be described below.

Each reception terminal checks its own main data buffer and redundant data buffer, and checks whether there is missing data. In a case where there is missing data, the reception terminal notifies the other reception terminal of information that can identify the missing data, such as frame_id, as request information by inter-device communication.

The reception terminal that has received the request information from the other reception terminal through inter-device communication checks whether or not there is the requested redundant data in its own redundant data buffer. If the redundant data exists, the reception terminal adds the redundant data to the information for inter-device communication, and transmits the information to the requesting reception terminal.

The reception terminal that has received the requested redundant data interpolates and reproduces the missing data using the redundant data. At this time, even if the reception terminal can acquire only data of a channel different from the channel originally reproduced, an effect equivalent to monophonic reproduction can be obtained.

As described above, the possible range of concealment can be widened without additional communication cost from the viewpoint of the transmission terminal.

Note that as redundant data used in the third embodiment, correlation data between channels can obviously be added in advance on the transmission terminal side. For example, the transmission terminal adds correlation data of the left channel and the right channel and transmits the resultant data to the reception terminal of the left channel. Thereafter, if there is a request from the reception terminal of the right channel, the reception terminal of the left channel adds redundant data of the left channel and the correlation data, and transmits the resultant data to the reception terminal of the right channel. The method of handling the correlation data is similar to the method of handling the correlation data described in the first embodiment, and the description thereof will be omitted.

Each of the reception terminals performs the above processing, so that packet loss concealment optimized for a system of a plurality of terminals (channels) can be achieved.

<Configuration of Audio Transmission System>

Figure 27:
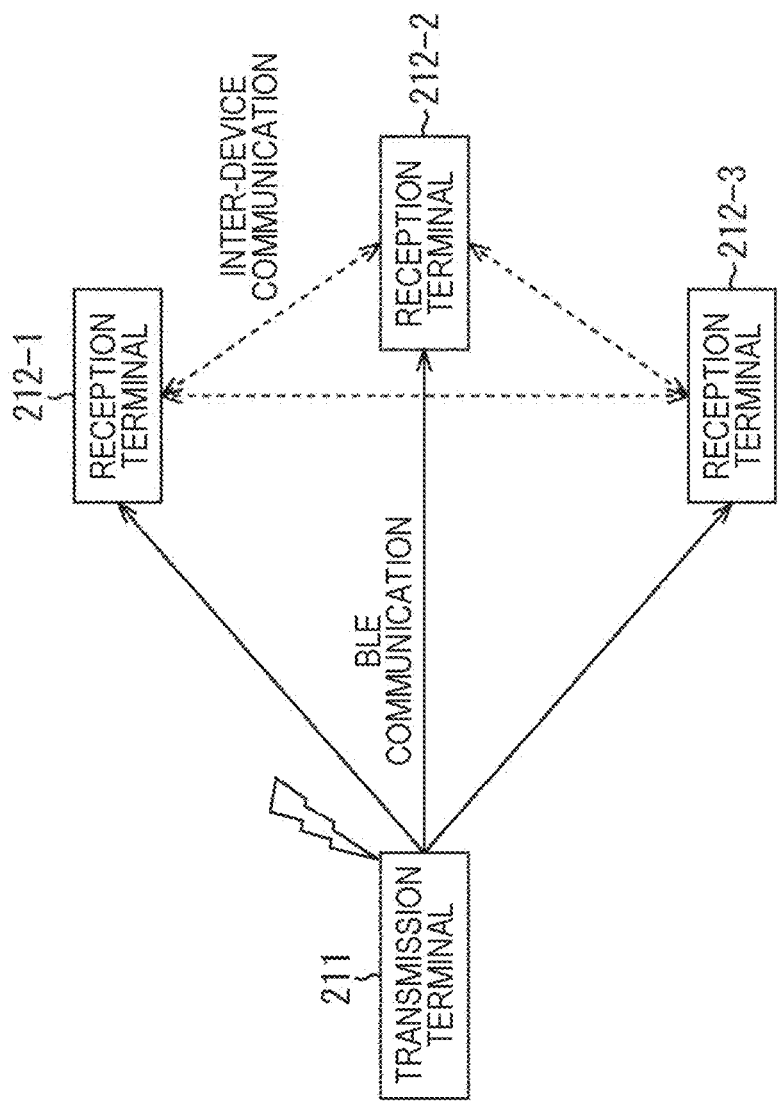
FIG. 27 is a diagram illustrating a configuration example of an audio transmission system according to a third embodiment of the present technology.

FIG. 27 is a diagram illustrating a configuration example of an audio transmission system according to the third embodiment of the present technology.

The audio transmission system is configured by connecting a transmission terminal 211 and reception terminals 212-1 to 212-3 by BLE communication. Additionally, in the audio transmission system, the reception terminals 212-1 to 212-3 perform inter-device communication by a dedicated communication method.

The transmission terminal 211 includes a multifunctional mobile phone such as a smartphone, a mobile terminal, or the like. The transmission terminal 211 generates a packet in a manner similar to those in the first and second embodiments, and transmits the packet to each of the reception terminals 212-1 to 212-3 by BLE communication.

The reception terminals 212-1 to 212-3 output sounds corresponding to audio channels, for example, the left channel and the right channel in the case of fully wireless earphones.

Note that in a case of a device that can perform stereo reproduction by one device, such as a wireless speaker, data of both the left channel and the right channel can be transmitted in one packet by a method similar to that in the second embodiment.

The reception terminals 212-1 to 212-3 receive packets transmitted from the transmission terminal 211 by BLE communication, decode the packets by a method similar to those in the first and second embodiments, and reproduce the packets. Additionally, the reception terminals 212-1 to 212-3 transmit and receive the above-described request information and related redundant data in addition to control information by inter-device communication.

Note that hereinafter, in a case where it is not necessary to distinguish the reception terminals 212-1 to 212-3, they are referred to as a reception terminal 212. Additionally, hereinafter, for convenience of description, it is assumed that one reception terminal 212 receives one channel.

<Configuration Example of Transmission Terminal>

Figure 28:
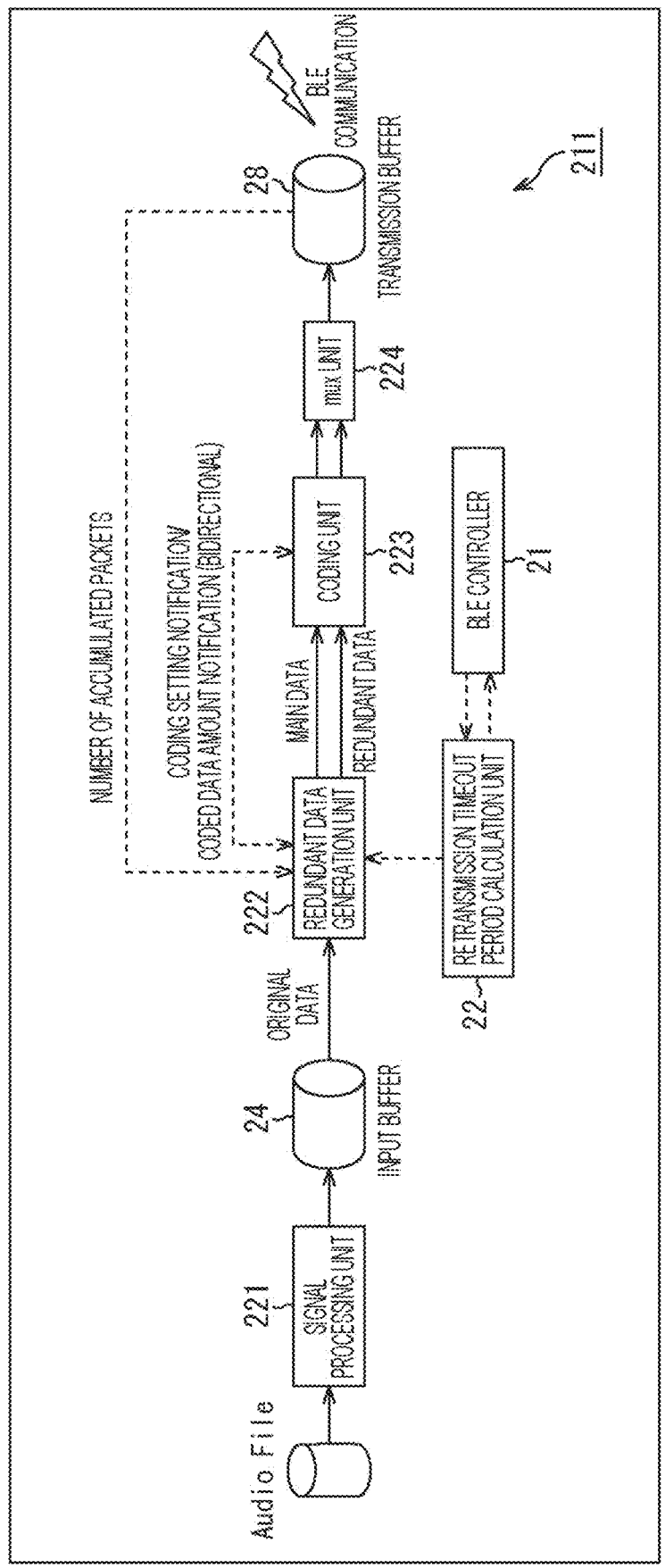
FIG. 28 is a block diagram illustrating a configuration example of a transmission terminal.

FIG. 28 is a block diagram illustrating a configuration example of the transmission terminal 211.

The transmission terminal 211 in FIG. 28 is different from the transmission terminal 11 in FIG. 6 in that the signal processing unit 23 is changed to a signal processing unit 221, the redundant data generation unit 25 is changed to a redundant data generation unit 222, the coding unit 26 is changed to a coding unit 223, and the mux unit 27 is changed to a mux unit 224. Among the configurations illustrated in FIG. 28, the same configurations as those described with reference to FIG. 6 are denoted by the same reference numerals. Overlapping descriptions will be omitted as appropriate.

The signal processing unit 221 performs preprocessing of audio coding by a method similar to that of the signal processing unit 23 in FIG. 6, adds information indicating which audio channel data the frame includes, and accumulates the data in the input buffer 24.

The redundant data generation unit 222 and the coding unit 223 acquire, from the input buffer 24, original data necessary for generating one packet of a certain audio channel, and generate and code main data and redundant data by a method similar to that of the redundant data generation unit 25 and the coding unit 26 in FIG. 6. The coded main data and redundant data are supplied to the mux unit 224.

The mux unit 224 stores the main data and the redundant data supplied from the coding unit 223 in a packet for BLE communication by a method similar to that of the mux unit 27 in FIG. 6, and obtains a transmission destination from information indicating which audio channel data the packet includes. The mux unit 224 accumulates packets for BLE communication in a transmission buffer 28.

Note that the operation of the transmission terminal 211 is similar to that of the first or second embodiment except that which audio channel each piece of data belongs is considered, and thus the description thereof will be omitted.

<Configuration Example of Reception Terminal>

Figure 29:
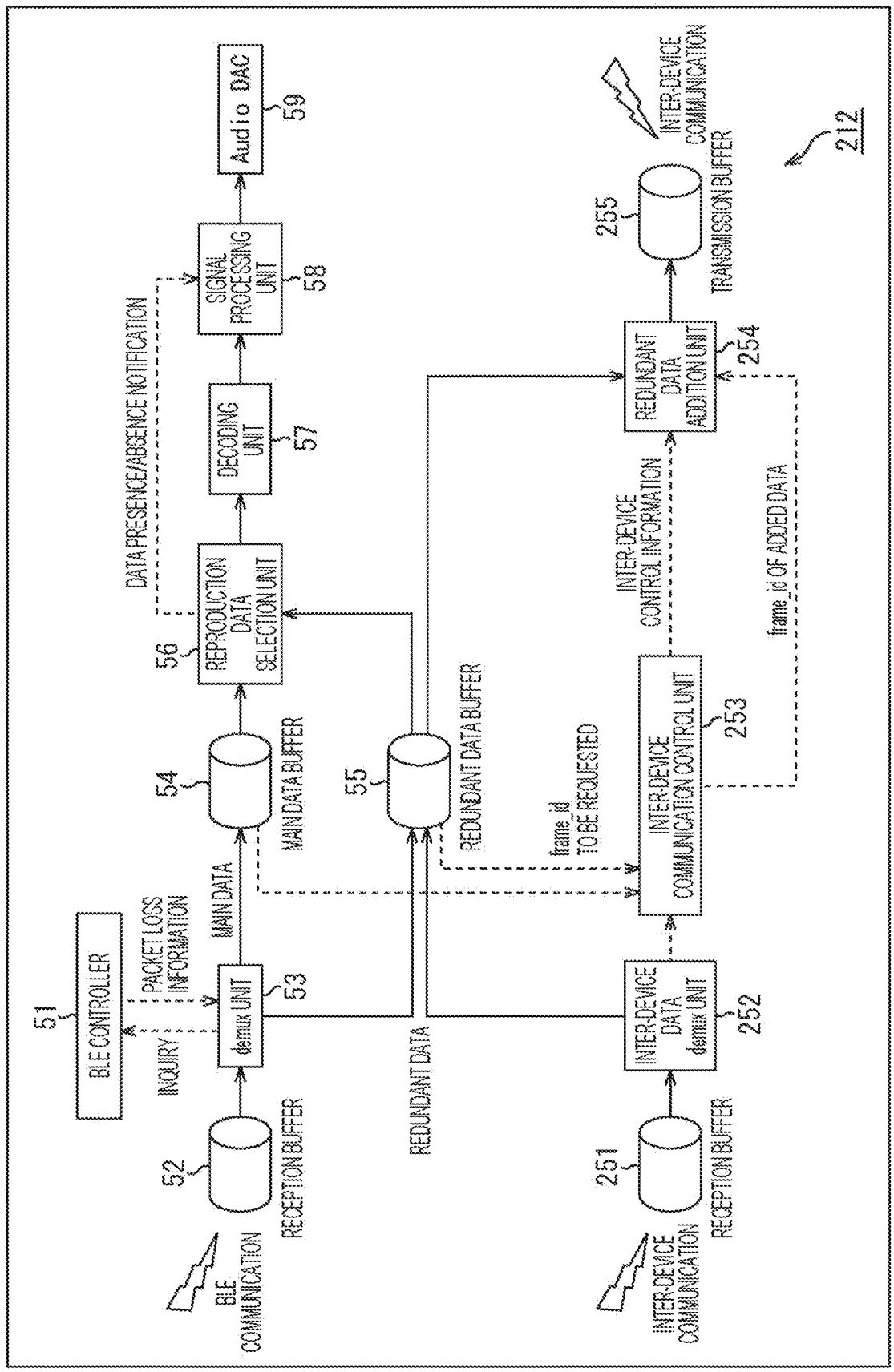
FIG. 29 is a block diagram illustrating a configuration example of a reception terminal.

FIG. 29 is a block diagram illustrating a configuration example of the reception terminal 212. Among the configurations illustrated in FIG. 29, the same configurations as those described with reference to FIG. 12 are denoted by the same reference numerals. Overlapping descriptions will be omitted as appropriate.

The transmission terminal 211 in FIG. 29 is different from the reception terminal 12 in FIG. 12 in that a reception buffer 251, an inter-device data demux unit 252, an inter-device communication control unit 253, a redundant data addition unit 254, and a transmission buffer 255 are added.

The reception buffer 251 receives and accumulates packets by inter-device communication.

The inter-device data demux unit 252 acquires packets of inter-device data accumulated in the reception buffer 251. In a case where the redundant data is added to the acquired packet, the inter-device data demux unit 252 separates the redundant data, accumulates the redundant data in a redundant data buffer 55, and outputs other information (hereinafter referred to as inter-device control information) to the inter-device communication control unit 253.

The inter-device communication control unit 253 acquires the inter-device control information supplied from the inter-device data demux unit 252 and transmitted from the other reception terminal 212. Inter-device control information may include a request for redundant data from another reception terminal 212. In this case, the inter-device communication control unit 253 checks data existing in the redundant data buffer 55 among data of frame_id requested from the other reception terminal 212. The inter-device communication control unit 253 sets the redundant data existing in the redundant data buffer 55 as redundant data to be added to the inter-device control information. The inter-device communication control unit 253 outputs the inter-device control information transmitted by itself and frame_id of the redundant data to be added to the redundant data addition unit 254.

The redundant data addition unit 254 acquires the redundant data corresponding to frame_id of the redundant data to be added from the redundant data buffer 55. The redundant data addition unit 254 adds the acquired redundant data to the inter-device control information, stores the information in a packet suitable for inter-device communication, and accumulates the packet in the transmission buffer 255.

Additionally, the inter-device communication control unit 253 checks the main data buffer 54 and the redundant data buffer 55, and acquires frame_id requested from the inter-device communication control unit 253 itself to the other reception terminal 212. The inter-device communication control unit 253 adds information of frame_id of the redundant data to be requested to the inter-device control information transmitted by itself, and outputs the information to the redundant data addition unit 254.

The redundant data addition unit 254 stores the inter-device control information in a packet suitable for inter-device communication, and accumulates the packet in the transmission buffer 255.

The packets accumulated in the transmission buffer 255 are transmitted to the other reception terminal 212 by inter-device communication.

<Operation of Reception Terminal>

Hereinafter, in the basic processing flow of the reception terminal 212 of the third embodiment, only inter-device communication control processing that differs from the first or second embodiment will be described. Inter-device communication control processing is performed at a timing independent of BLE communication and the data acquisition processing and audio reproduction processing described in the first and second embodiments.

<Inter-Device Communication Control Processing>

Figure 30:
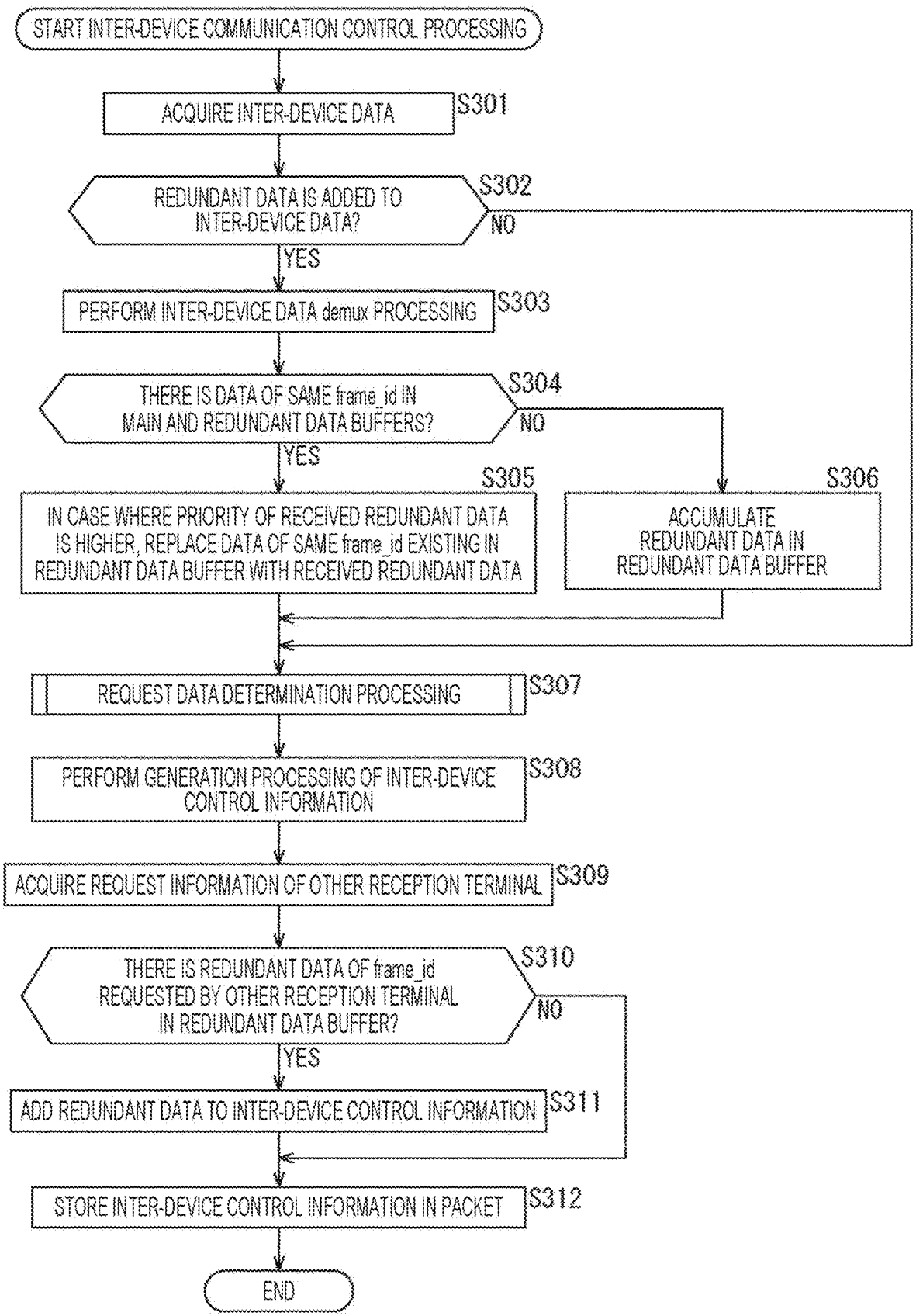
FIG. 30 is a flowchart for describing inter-device communication control processing of the reception terminal.

FIG. 30 is a flowchart for describing inter-device communication control processing of the reception terminal 212.

Hereinafter, for convenience of description, it is assumed that the reproduction timings are synchronized with an allowable degree of accuracy among the reception terminals 212. Additionally, it is assumed that frame_id can be correctly shared by all the reception terminals 212 as a number indicating a frame at the same timing in audio data of the transmission terminal 211.

In step S301, the inter-device data demux unit 252 acquires a packet of inter-device data transmitted from the other reception terminal 212 and accumulated in the reception buffer 251.

In step S302, the inter-device data demux unit 252 determines whether or not redundant data is added to the inter-device data. If it is determined in step S302 that redundant data has been added to the inter-device data, the processing proceeds to step S303.

In step S303, the inter-device data demux unit 252 performs inter-device data demux processing to separate redundant data.

In step S304, the inter-device data demux unit 252 determines whether or not there is data of the same frame_id in the main data buffer 54 and the redundant data buffer 55. If it is determined that there is data of the same frame_id in the main data buffer 54 and the redundant data buffer 55, the processing proceeds to step S305.

In step S305, in a case where the priority of the redundant data received from the other reception terminal 212 is higher, the inter-device data demux unit 252 replaces the data of the same frame_id existing in the redundant data buffer 55 with the redundant data already received from the other reception terminal 212 and accumulated in the reception buffer 251.

For example, in the case of the reception terminal 212 that receives left channel audio data, a left channel audio signal has a higher priority and a right channel audio signal has a lower priority.

On the other hand, in a case where the priority of the redundant data received from the other reception terminal 212 is lower, the inter-device data demux unit 252 discards the received redundant data.

For example, in a case where the reception terminal reproduces the audio signal of ch 1 and the redundant data corresponding to {frame_id, ch}={150, 1} exists in the redundant data buffer 55, even if redundant data corresponding to {frame_id, ch}={150, 2} is newly received, the received redundant data is discarded.

If it is determined in step S304 that there is no data of the same frame_id in the main data buffer 54 and the redundant data buffer 55, the processing proceeds to step S306.

In step S306, the inter-device data demux unit 252 accumulates the redundant data received from the other reception terminal 212 in the redundant data buffer 55.

On the other hand, if it is determined in step S302 that redundant data is not added to inter-device data, the processing in steps S303 to S306 is skipped, and the processing proceeds to step S307.

In step S307, the inter-device communication control unit 253 performs request data determination processing. Details of request data determination processing will be described later with reference to FIG. 31. By the processing of step S307, the main data buffer 54 and redundant data buffer 55 of the inter-device communication control unit 253 itself are checked, and a list of frame_ids to be requested is obtained.

The inter-device communication control unit 253 sets the list of frame_ids to be requested and its own channel information together as request information of the reception terminal 212. For example, for the reception terminal 212 that receives ch2, the request information is configured as {frame_id, ch}={150, 2}, {167, 2}, {180, 2}, and so on.

For example, it is assumed that the own terminal is a reception terminal that reproduces the audio signal of ch1, and the request target terminal is a reception terminal that reproduces the audio signal of ch2, but also receives the audio signal of ch1. In such a case, the own terminal requests the reception terminal 212 for {frame_id, ch}={150, 1} having a high priority.

Note that the request for channels can be made indiscriminately. The request information in this case is configured as, for example, {frame_id, ch}={150, x (don't care)}.

In step S308, the inter-device communication control unit 253 performs generation processing of inter-device control information. Specifically, the inter-device communication control unit 253 generates inter-device control information to be transmitted by itself in addition to the request information. Additionally, the inter-device communication control unit 253 adds the above-described request information to the generated inter-device control information as necessary.

In step S309, the inter-device communication control unit 253 acquires request information of the other reception terminal 212 from the inter-device data acquired in step S301. The inter-device communication control unit 253 outputs the inter-device control information and frame_id of the redundant data to be added to the redundant data addition unit 254.

In step S310, the redundant data addition unit 254 determines whether or not there is redundant data corresponding to frame_id in the request information from the other reception terminal 212 in the redundant data buffer 55. If it is determined in step S310 that there is redundant data corresponding to frame_id in the request information from the other reception terminal 212, the processing proceeds to step S311.

In step S311, the redundant data addition unit 254 selects redundant data to be added according to the amount that can be added and the addition priority, and adds the selected redundant data to the inter-device control information. Addition priority is used to preferentially transmit an old frame_id as much as possible. Note that the priority related to the channel described above may also be considered.

Additionally, if it is determined in step S310 that there is no redundant data corresponding to frame_id in the request information from the other reception terminal 212, the processing in step S311 is skipped, and the processing proceeds to step S312.

In step S312, the redundant data addition unit 254 stores the inter-device control information in a packet suitable for inter-device communication, and accumulates the packet in the transmission buffer 255.

The packets accumulated in the transmission buffer 255 are transmitted to the other reception terminal 212 by inter-device communication. Thereafter, the inter-device communication control processing ends.

<Request Data Determination Processing>

Figure 31:
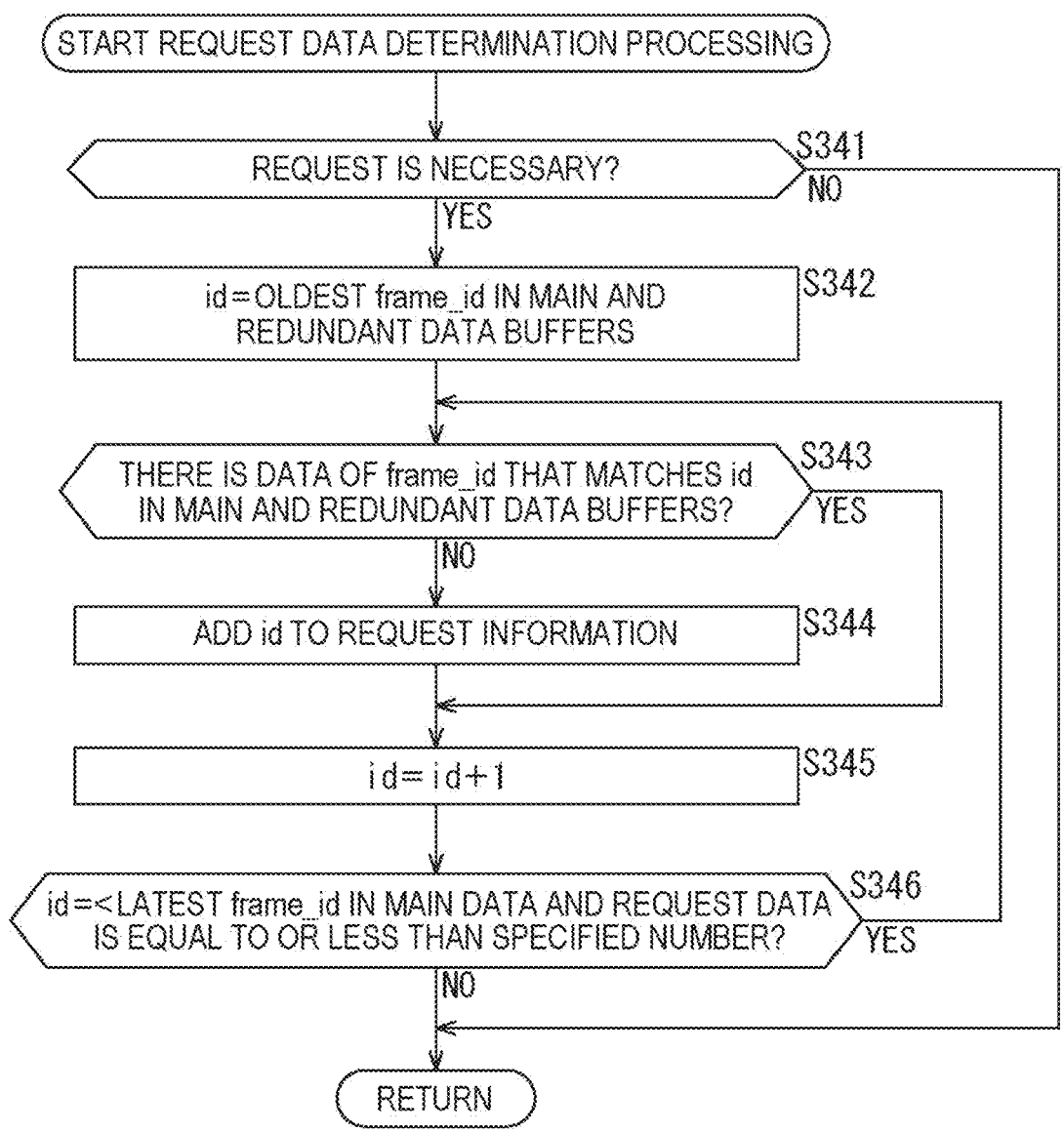
FIG. 31 is a flowchart for describing request data determination processing in step S307 of FIG. 30.

FIG. 31 is a flowchart for describing request data determination processing in step S307 of FIG. 30.

In this processing, in order to confirm whether or not there is data to be requested, a variable id that temporarily holds frame_id is prepared.

In step S341, the inter-device communication control unit 253 determines whether or not a request for redundant data is necessary. For example, in a situation where packet loss has not occurred for a long time, it is not necessary to make a request. Hence, it is determined that a request for redundant data is not necessary, and the request data determination processing is ended.

If is determined in step S341 that a request for redundant data is necessary, the processing proceeds to step S342.

In step S342, the inter-device communication control unit 253 substitutes frame_id of the oldest data currently in its own main data buffer 54 and redundant data buffer 55 into id and initializes id.

In step S343, the inter-device communication control unit 253 determines whether or not there is data of frame_id that matches id in the main data buffer 54 and the redundant data buffer 55. If it is determined in step S343 that there is no data of frame_id that matches the id in the main data buffer 54 and the redundant data buffer 55, the processing proceeds to step S344.

In step S344, the inter-device communication control unit 253 adds the id to request information.

If it is determined in step S343 that there is data of frame_id that matches the id in the main data buffer 54 and the redundant data buffer 55, the processing of step S344 is skipped, and the processing proceeds to step S345.

In step S345, the inter-device communication control unit 253 updates the id to id+1.

In step S346, the inter-device communication control unit 253 determines whether or not the id is equal to or less than the latest frame_id in the main data buffer 54 and whether or not the request data is equal to or less than a number specified in advance. If it is determined in step S346 that the id is equal to or less than the latest frame_id in the main data buffer 54 and the request data is equal to or less than the specified number, the processing returns to step S343, and the processing in step S343 and subsequent steps is repeated.

If it is determined in step S346 that the id has become larger than the latest frame_id in the main data or the request data has become larger than the specified number, the request data determination processing is ended.

In this way, by specifying a number in advance and setting the number of pieces of request data to be equal to or less than the specified number, it is possible to curb an unnecessary increase in the data amount of inter-device communication.

As described above, according to the third embodiment of the present technology, it is possible to curb variation in the packet loss occurrence probability due to the device in the same communication status. Hence, it is possible to achieve stable voice transmission regardless of the device.

Additionally, according to the third embodiment, in a system of voice transmission to a plurality of devices (channels), the frequency of sound interruption can be reduced as compared with a single device.

Note that the technology of the third embodiment can be applied not only to the first embodiment but also to the second embodiment.

4. Other

Computer Configuration Example

The series of processing described above can be performed by hardware or software. In a case where the series of processing is executed by software, a program forming the software is installed from a program recording medium to a computer incorporated in dedicated hardware, a general-purpose personal computer, or the like.

FIG. 32 is a block diagram illustrating a hardware configuration example of a computer that executes the series of processing described above according to a program.

A central processing unit (CPU) 301, a read only memory (ROM) 302, and a random access memory (RAM) 303 are mutually connected through a bus 304.

An input/output interface 305 is also connected to the bus 304. An input unit 306 including a keyboard, a mouse, and the like, and an output unit 307 including a display, a speaker, and the like are connected to the input/output interface 305. Additionally, a storage unit 308 such as a hard disk and a non-volatile memory, a communication unit 309 such as a network interface, and a drive 310 for driving a removable medium 311 are connected to the input/output interface 305.

In the computer configured as described above, the CPU 301 loads a program stored in the storage unit 308 onto the RAM 303 through the input/output interface 305 and the bus 304, and executes the program to perform the above-described series of processing, for example.

The program executed by the CPU 301 is provided by being recorded in the removable medium 311 or through a wired or wireless transmission medium such as a local area network, the Internet, or digital broadcasting, and is installed in the storage unit 308, for example.

Note that the program executed by the computer may be a program that performs processing in chronological order according to the order described in the present specification, or a program that performs processing in parallel, or at a necessary timing such as when a call is made.

Note that in the present specification, a system means a collection of a plurality of components (devices, modules (parts), and the like), and it does not matter whether or not all the components are in the same case. Accordingly, a plurality of devices housed in separate casings and connected through a network, and one device housing a plurality of modules in one casing are both systems.

Additionally, the effect described in the present specification is merely an illustration and is not restrictive. Hence, other effects can be obtained.

Embodiments of the present technology are not limited to the above-described embodiments, and various modifications can be made without departing from the scope of the present technology.

For example, the present technology can have a cloud computing configuration in which one function is shared and processed by a plurality of devices through a network.

Additionally, each step described in the above-described flowchart can be executed by one device or be executed in a shared manner by a plurality of devices.

Moreover, in a case where a plurality of processes is included in one step, the plurality of processes included in one step can be executed by one device or be executed in a shared manner by a plurality of devices.

<Exemplar Combination of Configuration>

The present technology can also be configured as follows.

(1)

A reception terminal including:

a reception unit that receives a packet transmitted from a transmission terminal, the packet including main data and redundant data generated on the basis of a redundancy degree determined on the basis of a retransmission timeout period that is a time determined by a combination of the transmission terminal and the reception terminal and in which retransmission processing of the main data can be repeatedly executed and used for restoration or interpolation of the main data; and a decoding unit that decodes reproduction data by decoding the main data or the redundant data.

(2)

The reception terminal according to (1) above further including:

a main data buffer that accumulates the main data; and a redundant data buffer that accumulates the redundant data, in which in a case where the main data corresponding to the reproduction data is not present in the main data buffer, the decoding unit decodes the reproduction data by decoding the redundant data corresponding to the reproduction data read from the redundant data buffer.

(3)

The reception terminal according to (1) or (2) above, in which the redundancy degree is represented by the number of pieces of redundant data per packet.

(4)

The reception terminal according to (1) or (2) above, in which the redundant data corresponds to a frame before or after a frame to which the main data included in a same packet corresponds, and the redundancy degree is adjusted by a range of the frame to which the redundant data in the packet corresponds.

(5)

The reception terminal according to any one of (1) to (4) above, in which proportions of an amount of the main data and an amount of the redundant data in a packet are adjusted.

(6)

The reception terminal according to any one of (1) to (5) above, in which a region in a packet freed by coding the redundant data is allocated to a region of the main data.

(7)

The reception terminal according to any one of (1) to (6) above, in which the redundant data is generated on the basis of the redundancy degree and a feature amount of the main data.

(8)

The reception terminal according to any one of (1) to (7) above, in which the redundant data is correlation data regarding a correlation between the main data and the redundant data or a correlation between the redundant data and another redundant data.

(9)

The reception terminal according to any one of (1) to (8) above, in which the reception unit adds a data number for identifying data to be reproduced to the main data and the redundant data on the basis of packet loss information indicating loss of the packet.

(10)

The reception terminal according to (1) above, in which the redundancy degree is determined on the basis of the retransmission timeout period and the number of packets accumulated in a transmission buffer.

(11)

The reception terminal according to (10) above, in which the number of pieces of main data, which is the number of pieces of the main data per packet, is determined on the basis of the retransmission timeout period and the number of packets accumulated in the transmission buffer.

(12)
The reception terminal according to (11) above, in which
a threshold to be compared with the number of packets accumulated in the transmission buffer to determine the number of pieces of main data is changed according to the retransmission timeout period.

(13)
The reception terminal according to (11) or (12) above, in which
the redundancy degree is changed on the basis of the number of pieces of main data and the retransmission timeout period.

(14)
The reception terminal according to (13) above, in which
a data amount of the main data is changed on the basis of the number of pieces of main data, the number of pieces of the redundant data per packet, and a data amount of the redundant data.

(15)
The reception terminal according to any one of (11) to (14) above, in which
a transmission data number, which is a number corresponding to the main data at a head of the packet when pieces of main data are sequentially numbered in time series, is added to the packet.

(16)
The reception terminal according to (15) above, in which
the reception unit adds a data number for identifying data to be reproduced to the main data and the redundant data on the basis of the transmission data number.

(17)
The reception terminal according to (2) above further including
a communication unit that communicates with another reception terminal that receives a packet transmitted from the transmission terminal, in which
the communication unit receives the redundant data from the another reception terminal.

(18)
The reception terminal according to (17) above further including
a control unit that makes a request for the redundant data corresponding to the reproduction data to the another reception terminal in a case where the main data corresponding to the reproduction data is not in the main data buffer and the redundant data corresponding to the reproduction data is not in the redundant data buffer, in which
the communication unit receives the redundant data transmitted from the another reception terminal in response to the request.

(19)
The reception terminal according to (17) or (18) above, in which
the communication unit reads the redundant data requested from the another reception terminal from the redundant data buffer and transmits the redundant data to the another reception terminal.

(20)
A reception method including:
a reception terminal
receiving a packet transmitted from a transmission terminal, the packet including main data and redundant data generated on the basis of a redundancy degree determined on the basis of a retransmission timeout period that is a time determined by a combination of the transmission and reception terminals and in which retransmission processing of the main data can be repeatedly executed and used for restoration or interpolation of the main data; and
decoding reproduction data by decoding the main data or the redundant data.

(21)
A transmission terminal including:
a redundant data generation unit that determines a redundancy degree of redundant data used for restoration or interpolation of main data on the basis of a retransmission timeout period that is a time determined by a combination of the transmission terminal and a reception terminal and is a time in which retransmission processing of the main data can be repeatedly executed; and
a transmission unit that transmits a packet including the main data and the redundant data generated on the basis of the redundancy degree.

(22)
The transmission terminal according to (21) above, in which
the redundancy degree is represented by the number of pieces of the redundant data per packet.

(23)
The transmission terminal according to (21) above, in which
the redundant data corresponds to a frame before or after a frame to which the main data included in a same packet corresponds, and
the redundant data generation unit adjusts the redundancy degree by a range of the frame to which the redundant data in the packet corresponds.

(24)
The transmission terminal according to any one of (21) to (23) above, in which
the redundant data generation unit adjusts proportions of an amount of the main data and an amount of the redundant data in a packet.

(25)
The transmission terminal according to any one of (21) to (24) above, in which
the redundant data generation unit allocates a region in a packet freed by coding the main data and the redundant data to a region of the main data.

(26)
The transmission terminal according to any one of (21) to (25) above, in which
the redundant data generation unit generates the redundant data on the basis of the redundancy degree and a feature amount of the main data.

(27)
The transmission terminal according to any one of (21) to (26) above, in which
the redundant data generation unit sets correlation data regarding a correlation between the main data and the redundant data or a correlation between the redundant data and another redundant data as the redundant data.

(28)
The transmission terminal according to (21) above, in which
the redundant data generation unit determines a redundancy degree of the redundant data on the basis of the retransmission timeout period and the number of packets accumulated in a transmission buffer.

(29)

The transmission terminal according to (28) above, in which the redundant data generation unit determines the number of pieces of main data, which is the number of pieces of the main data per packet, on the basis of the retransmission timeout period and the number of packets accumulated in the transmission buffer.

(30)

The transmission terminal according to (29) above, in which the redundant data generation unit changes a threshold to be compared with the number of packets accumulated in the transmission buffer to determine the number of pieces of main data according to the retransmission timeout period.

(31)

The transmission terminal according to (29) or (30) above, in which the redundant data generation unit changes the redundancy degree on the basis of the number of pieces of main data and the retransmission timeout period.

(32)

The transmission terminal according to (29) above, in which the redundant data generation unit changes a data amount of the main data on the basis of the number of pieces of main data, the number of pieces of the redundant data per packet, and a data amount of the redundant data.

(33)

The transmission terminal according to any one of (28) to (32) above further including a control unit that adds, to the packet, a value corresponding to the main data at a head of the packet when pieces of the main data are sequentially numbered in time series, as a transmission data number.

(34)

The transmission terminal according to (21) above further including a signal processing unit that adds identification information for identifying a channel of a frame, in which the transmission unit performs transmission by obtaining a reception terminal as a transmission destination of a packet corresponding to the frame from among a plurality of reception terminals on the basis of the identification information.

(35)

A transmission method including:

a transmission terminal determining a redundancy degree of redundant data used for restoration or interpolation of main data on the basis of a retransmission timeout period that is a time determined by a combination of the transmission terminal and a reception terminal and is a time in which retransmission processing of the main data can be repeatedly executed; and transmitting a packet including the main data and the redundant data generated on the basis of the redundancy degree.

REFERENCE SIGNS LIST

| | |
|---|---|
| 11 | Transmission terminal |
| 12 | Reception terminal |
| 21 | BLE controller |

-continued

REFERENCE SIGNS LIST

| | |
|---|---|
| 22 | Retransmission timeout period calculation unit |
| 23 | Signal processing unit |
| 24 | Input buffer |
| 25 | Redundant data generation unit |
| 26 | Coding unit |
| 27 | mux unit |
| 28 | Transmission buffer |
| 51 | BLE controller |
| 52 | Reception buffer |
| 101 | Redundant data generation unit |
| 102 | Coding unit |
| 103 | mux unit |
| 28 | Transmission buffer |
| 211 | Transmission terminal |
| 221 | Signal processing unit |
| 222 | Redundant data generation unit |
| 223 | Coding unit |
| 251 | Reception buffer |
| 252 | Inter-device data demux unit |
| 253 | Inter-device communication control unit |
| 254 | Redundant data addition unit |
| 255 | Transmission buffer |

The invention claimed is:

1. A reception terminal comprising:

processing circuitry configured to:

receive a packet transmitted from a transmission terminal, the packet including main data and redundant data generated on a basis of a redundancy degree determined on a basis of a retransmission timeout period that is a time determined according to a parameter based on a combination of the transmission terminal and the reception terminal at a time of connection and in which retransmission processing of the main data can be repeatedly executed and used for restoration or interpolation of the main data; and decode reproduction data by decoding the main data or the redundant data, wherein the received packet comprises the main data and the redundant data in one packet;

a main data buffer that accumulates the main data; and a redundant data buffer that accumulates the redundant data, wherein the processing circuitry is further configured to:

communicate with another reception terminal that receives a packet transmitted from the transmission terminal;

make a request for the redundant data corresponding to the reproduction data to the other reception terminal in a case where the main data corresponding to the reproduction data is not in the main data buffer and the redundant data corresponding to the reproduction data is not in the redundant data buffer; and receive the redundant data transmitted from the other reception terminal in response to the request.

2. The reception terminal according to claim 1, wherein the redundancy degree is represented by the number of pieces of the redundant data per packet.

3. The reception terminal according to claim 1, wherein the redundant data corresponds to a frame before or after a frame to which the main data included in a same packet corresponds, and the redundancy degree is adjusted by a range of the frame to which the redundant data in the packet corresponds.

4. The reception terminal according to claim 1, wherein proportions of an amount of the main data and an amount of the redundant data in a packet are adjusted.

5. The reception terminal according to claim 1, wherein a region in a packet freed by coding the redundant data is allocated to a region of the main data.

6. The reception terminal according to claim 1, wherein the redundant data is generated on a basis of the redundancy degree and a feature amount of the main data.

7. The reception terminal according to claim 1, wherein the redundant data includes correlation data regarding a correlation between the main data and the redundant data or a correlation between the redundant data and another redundant data.

8. The reception terminal according to claim 1, wherein the processing circuitry is configured to add a data number for identifying data to be reproduced to the main data and the redundant data on a basis of packet loss information indicating loss of the packet.

9. The reception terminal according to claim 1, wherein the redundancy degree is determined on a basis of the retransmission timeout period and the number of packets accumulated in a transmission buffer.

10. The reception terminal according to claim 9, wherein the number of pieces of main data, which is the number of pieces of the main data per packet, is determined on a basis of the retransmission timeout period and the number of packets accumulated in the transmission buffer.

11. The reception terminal according to claim 10, wherein a threshold to be compared with the number of packets accumulated in the transmission buffer to determine the number of pieces of main data is changed according to the retransmission timeout period.

12. The reception terminal according to claim 10, wherein the redundancy degree is changed on a basis of the number of pieces of main data and the retransmission timeout period.

13. The reception terminal according to claim 12, wherein a data amount of the main data is changed on a basis of the number of pieces of main data, the number of pieces of the redundant data per packet, and a data amount of the redundant data.

14. The reception terminal according to claim 10, wherein a transmission data number, which is a number corresponding to the main data at a head of the packet when pieces of main data are sequentially numbered in time series, is added to the packet.

15. The reception terminal according to claim 14, wherein the processing circuitry is configured to add a data number for identifying data to be reproduced to the main data and the redundant data on a basis of the transmission data number.

16. A reception method executed by a reception terminal, the reception method comprising:
receiving a packet transmitted from a transmission terminal, the packet including main data and redundant data generated on a basis of a redundancy degree determined on a basis of a retransmission timeout period that is a time determined according to a parameter based on a combination of the transmission and reception terminals at a time of connection and in which retransmission processing of the main data can be repeatedly executed and used for restoration or interpolation of the main data;
decoding reproduction data by decoding the main data or the redundant data, wherein the received packet comprises the main data and the redundant data in one packet;
communicating with another reception terminal that receives a packet transmitted from the transmission terminal;
making a request for the redundant data corresponding to the reproduction data to the other reception terminal in a case where the main data corresponding to the reproduction data is not in a main data buffer in the reception terminal and the redundant data corresponding to the reproduction data is not in a redundant data buffer in the reception terminal; and
receiving the redundant data transmitted from the other reception terminal in response to the request.

* * * * *